(12) United States Patent
Ozeki

(10) Patent No.: US 11,079,027 B2
(45) Date of Patent: Aug. 3, 2021

(54) CONTROL VALVE

(71) Applicant: YAMADA MANUFACTURING CO., LTD., Kiryu (JP)

(72) Inventor: Akifumi Ozeki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 16 days.

(21) Appl. No.: 16/723,274

(22) Filed: Dec. 20, 2019

(65) Prior Publication Data

US 2020/0309275 A1 Oct. 1, 2020

(30) Foreign Application Priority Data

Mar. 27, 2019 (JP) ............................. JP2019-060918

(51) Int. Cl.
*F16K 11/085* (2006.01)
*F16K 27/06* (2006.01)

(52) U.S. Cl.
CPC .......... *F16K 11/085* (2013.01); *F16K 27/065* (2013.01)

(58) Field of Classification Search
CPC ................. F16K 11/076; F16K 11/085; Y10T 137/86871
See application file for complete search history.

(56) References Cited

U.S. PATENT DOCUMENTS

| | | | | |
|---|---|---|---|---|
| 4,778,148 A * | 10/1988 | Kruger | ...................... | F01L 7/16 123/190.17 |
| 7,603,940 B2 * | 10/2009 | Stellwagen | ......... | F15B 11/0445 91/446 |
| 9,897,217 B2 * | 2/2018 | Greene | ................. | F16K 11/085 |
| 10,359,121 B2 * | 7/2019 | Ozeki | ........................ | F01P 5/12 |
| 10,458,562 B2 * | 10/2019 | Ozeki | ................. | F16K 11/0856 |
| 10,508,748 B2 * | 12/2019 | Ozeki | ........................ | F01P 7/16 |
| 10,626,999 B2 * | 4/2020 | Ozeki | ................. | F16K 11/0856 |
| 10,648,577 B2 * | 5/2020 | Ozeki | ................. | F16K 11/0712 |
| 2019/0291535 A1 * | 9/2019 | Ozeki | ...................... | F01P 7/165 |
| 2019/0292976 A1 * | 9/2019 | Ozeki | ........................ | F01P 7/14 |
| 2019/0390781 A1 * | 12/2019 | Ozeki | ...................... | F16K 5/181 |
| 2020/0049263 A1 * | 2/2020 | Ozeki | ................... | F16K 11/076 |
| 2020/0049264 A1 * | 2/2020 | Ozeki | ................... | F16K 11/085 |
| 2020/0088308 A1 * | 3/2020 | Ozeki | ..................... | F01P 7/165 |
| 2020/0309275 A1 * | 10/2020 | Ozeki | ................... | F16K 11/085 |
| 2020/0309276 A1 * | 10/2020 | Ozeki | ........................ | F01P 7/14 |

FOREIGN PATENT DOCUMENTS

| JP | 2016-138452 | 8/2016 |
|---|---|---|
| JP | 2017-003064 | 1/2017 |

* cited by examiner

*Primary Examiner* — Kevin R Barss
(74) *Attorney, Agent, or Firm* — Rankin, Hill & Clark LLP

(57) ABSTRACT

A control valve includes a casing, a valve body, and a seal cylinder member. The casing has an inlet and an outlet. The valve body is rotatably disposed inside the casing, and has a circumferential wall portion formed with a valve hole providing communication between the inside and the outside. One end portion of the seal cylinder member communicates with the outlet, and a valve sliding contact surface is provided at the other end portion. A flow rate control groove having a bottom surface which is recessed with respect to the outer circumferential surface of the circumferential wall portion and has one end portion continuous with the valve hole is provided on at least one of a front side and a rear side of an edge portion of the valve hole in the circumferential wall portion in a rotating direction of the valve body.

5 Claims, 13 Drawing Sheets

CONTROL VALVE

CROSS-REFERENCE TO RELATED APPLICATION

Priority is claimed on Japanese Patent Application No. 2019-060918, filed Mar. 27, 2019, the content of which is incorporated herein by reference.

BACKGROUND OF THE INVENTION

Field of the Invention

The present invention relates to a control valve used for switching a flow path of cooling water for a vehicle, or the like.

Description of Related Art

In a cooling system that cools an engine using cooling water, separately from a radiator flow path that circulates cooling water between a radiator and the engine, a bypass flow path that bypasses a radiator, a warm-up flow path that passes through an oil warmer, or the like, may also be provided. In a cooling system of this type, control valves are interposed at branch portions of flow paths, which are appropriately switched by the control valves. As a control valve, a valve in which a cylindrical valve body is rotatably disposed in a casing and an arbitrary flow path is opened and closed in accordance with a rotational position of the valve body is known (for example, see Japanese Unexamined Patent Application, First Publication No. 2017-3064 (hereinafter, Patent Document 1)).

In the control valve disclosed in Patent Document 1, an inlet through which a liquid such as cooling water flows in, and a plurality of outlet through which the liquid that has flowed in flows to the outside are provided in a casing. A plurality of valve holes providing communication between the inside and the outside are formed in a circumferential wall of the valve body corresponding to the plurality of outlets. One end portion side of a substantially cylindrical seal cylinder member is slidably held at each outlet. The one end portion of each seal cylinder member communicates with a downstream side of the corresponding outlet. Further, a valve sliding contact surface that slidably comes into contact with an outer circumferential surface of the valve body is provided at the other end portion of each seal cylinder member. The valve sliding contact surface of each seal cylinder member comes into sliding contact with the outer circumferential surface of the valve body at a position overlapping a rotational path of the corresponding valve hole of the valve body.

When the seal cylinder member is at a position where it communicates with the corresponding valve hole, the valve body of the control valve allows an outflow of the liquid from an internal region of the valve body through the corresponding outlet. When the seal cylinder member is at a position where it does not communicate with the corresponding valve hole, the valve body of the control valve blocks an outflow of the liquid from the internal region of the valve body through the corresponding outlet. Also, the rotational position of the valve body is operated using an actuator such as an electric motor.

The control valve of this type switches a communication state (communication and non-communication) between the seal cylinder member and the valve hole using rotation of the valve body. In addition, when the switching of the communication state using rotation of the valve body is rapidly performed, a flow rate of the liquid flowing through the outlet suddenly changes, and thus a pressure fluctuation on the outlet side easily increases. As a countermeasure against this, a control valve in which an amount of inflow of liquid from a valve hole side is gradually increased at an early stage of communication start or the like when a seal cylinder member starts to communicate with the valve hole is known (for example, see Japanese Unexamined Patent Application, First Publication No. 2016-138452 (hereinafter, Patent Document 2)).

In the control valve disclosed in Patent Document 2, a slit penetrating a circumferential wall portion of a valve body is formed forward in a rotating direction of the valve body from an edge portion of the valve hole in the circumferential wall portion of the valve body. The slit extends from the valve hole in the rotating direction of the valve body and guides the liquid in an internal region of the valve body to the seal cylinder member through the slit before the seal cylinder member directly communicates with the valve hole.

SUMMARY OF THE INVENTION

The control valve disclosed in Patent Document 2 is configured to gradually increase a flow rate of the liquid flowing into the seal cylinder member using the slit penetrating the circumferential wall portion of the valve body at an early stage of communication start of the seal cylinder member with the valve hole. For this reason, in order to make the increase of the flow rate at an early stage of communication start more gradual, there is no choice but to narrow a gap of the slit. However, if the gap of the slit is narrowed, contaminations mixed in the liquid are easily caught in the slit, and thus it becomes difficult to maintain desired performance over a long period of time.

Aspects according to the present invention have been derived in consideration of such circumstances, and it is an object of the present invention to provide a control valve in which a characteristic of a gradually changing flow rate at an outlet at the time of switching a communication state between a seal cylinder member and a valve hole can be maintained over a long period of time.

In order to solve the above problems, the present invention employs the following aspects.

(1) A control valve according to an aspect of the present invention includes a casing having an inlet through which a liquid flows in from an outside and an outlet through which the liquid that has flowed in an inside flows to the outside, a valve body which is rotatably disposed inside the casing and has a circumferential wall portion formed with a valve hole providing communication between the inside and the outside, and a seal cylinder member of which one axial end portion communicates with a downstream side of the outlet and the other axial end portion is provided with a valve sliding contact surface that slidably comes into contact with an outer circumferential surface of the circumferential wall portion at a position at least partially overlapping a rotational path of the valve hole of the valve body, in which a flow rate control groove having a bottom surface which is recessed with respect to the outer circumferential surface of the circumferential wall portion and has one end portion that is continuous with the valve hole is provided on at least one of a front side and a rear side of an edge portion of the valve hole in the circumferential wall portion in a rotating direction of the valve body.

According to the above aspect (1), when the other axial end portion of the seal cylinder member is closed by the outer circumferential surface of the circumferential wall portion of the valve body, outflow of the liquid from the inside of the valve body to the outlet is blocked. From this state, when the valve body rotates and the other axial end portion of the seal cylinder member communicates with (overlaps) the valve hole of the valve body, the liquid flows out from the inside of the valve body to the outlet.

In the case in which the flow rate control groove is provided on the front side of the edge portion of the valve hole in the rotating direction of the valve body, as the valve body rotates, the flow rate control groove gradually overlaps an internal passage of the seal cylinder member before the internal passage of the seal cylinder member communicates directly with the valve hole. Thus, the liquid inside the valve body flows out to the outlet through the valve hole and the flow rate control groove. At this time, when the overlap between the flow rate control groove and the seal cylinder member starts, an amount of the liquid flowing out from the inside of the valve body to the outlet gradually increases in accordance with an increase of an amount of the overlap. As a result, a sudden pressure fluctuation on the outlet side due to a large amount of the liquid suddenly flowing to the outlet is inhibited.

Also, in the case in which the flow rate control groove is provided on the rear side of the edge portion of the valve hole in the rotating direction of the valve body, when the communication is blocked from the state in which the valve hole and (the internal passage of) the seal cylinder member communicate directly with each other as the valve body rotates, only the flow rate control groove gets to overlap (the internal passage of) the seal cylinder member. At this time, the liquid inside the valve body flows out to the outlet via the valve hole and the flow rate control groove. The amount of the overlap between the flow rate control groove and (the internal passage of) the seal cylinder member decreases gradually as the valve body rotates, and thus the amount of the liquid flowing out to the outlet also decreases gradually. As a result, a sudden pressure fluctuation on the outlet side due to abrupt stopping of the flow of the liquid to the outlet is inhibited.

According to the above aspect (1), the flow rate of the liquid can be gradually changed due to the flow rate control groove having the bottom surface when the communication state between the seal cylinder member and the valve hole is switched. Accordingly, even if a groove width of the flow rate control groove is widened to some extent, minute flow control can be performed. Therefore, it is possible to prevent contaminations mixed in the liquid from being caught in the flow rate control groove.

(2) In the above aspect (1), the flow rate control groove may have the bottom surface that is inclined such that an opening area thereof increases toward the valve hole. In this case, it becomes possible to smoothly increase or decrease the flow rate of the liquid to the outlet in accordance with a change in the amount of the overlap between the flow rate control groove and (the internal passage of) the seal cylinder member.

(3) In the above aspect (1) or (2), the control valve may be provided with a plurality of the valve holes of the valve body and a plurality of the seal cylinder members corresponding to the valve holes, and the flow rate control groove may be provided at the edge portion of the valve hole on a communication start side where it first communicates with the corresponding seal cylinder member from a state in which all the seal cylinder members are blocked by the circumferential wall portion of the valve body.

When one seal cylinder member first communicates with the valve hole from the state in which all the seal cylinder members are blocked by the circumferential wall portion of the valve body, the liquid in the casing tends to flow hard to the outlet through the valve hole. However, in the above aspect (3), since the flow rate control groove having the bottom surface is provided at the edge portion of the valve hole on the communication start side that first communicates, it is possible to make the inflow of the liquid to the outlet at the time of starting the communication gradual, thereby inhibiting a sudden pressure fluctuation.

(4) In any one of the above aspects (1) to (3), the control valve may be provided with a plurality of the valve holes of the valve body and a plurality of the seal cylinder members corresponding to the valve holes, and the flow rate control groove may be provided at the edge portion of the valve hole on a communication end side where one seal cylinder member is blocked at the end from a state in which remaining seal cylinder members are blocked by the circumferential wall portion of the valve body while leaving the one seal cylinder member.

When the last one seal cylinder member is blocked from the state where the remaining seal cylinder members are blocked, the flow of the liquid flowing to the outlet through the last one seal cylinder member tends to stop abruptly. In the above aspect (4), since the flow rate control groove having the bottom surface is provided at the edge portion of the valve hole on the communication end side which blocks the seal cylinder member at the end, it is possible to moderate stoppage of the inflow of the liquid to the outlet at the time of the communication end, thereby inhibiting a sudden pressure fluctuation.

According to the aspects of the present invention, the flow rate control groove having the bottom surface which is recessed with respect to the outer circumferential surface of the circumferential wall portion and has the one end portion continuous with the valve hole is provided in the circumferential wall portion on at least one of the front side and the rear side of the edge portion of the valve hole in the rotating direction of the valve body. For this reason, it is possible to inhibit an abrupt change in flow rate at the outlet at the time of communication start and communication end due to functions of the flow rate control groove. In addition, since the flow rate control groove according to the aspects of the present invention has the bottom surface which is recessed with respect to the outer circumferential surface of the circumferential wall portion and has the one end portion continuous with the valve hole, it is possible to inhibit an abrupt change in flow rate at the outlet at the time of the communication start and the communication end of the seal cylinder member without greatly narrowing the groove width.

Therefore, according to the aspects of the present invention, it is possible to maintain a characteristic of a gradually changing flow rate at the outlet at the time of switching the communication state between the seal cylinder member and the valve hole over a long period of time while preventing desired performance from deteriorating due to contaminations being caught therein and the like.

DETAILED DESCRIPTION OF THE INVENTION

Next, an embodiment of the present invention will be described with reference to the drawings. In the following description, an example in which a control valve of the present embodiment is employed in a cooling system that cools an engine using cooling water will be described.

<Cooling System>

Figure 1:
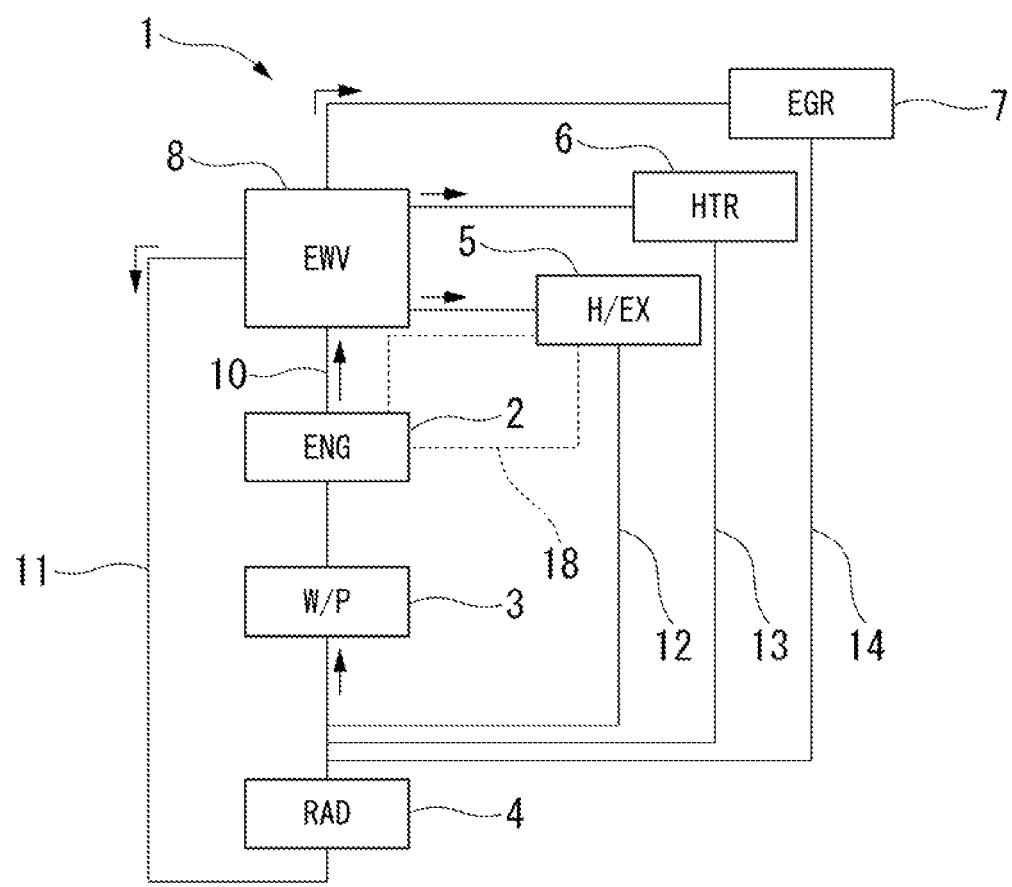
FIG. 1 is a block diagram of a cooling system according to an embodiment.

FIG. 1 is a block diagram of a cooling system 1.

As shown in FIG. 1, the cooling system 1 is mounted in a vehicle having at least an engine in a vehicle drive source. Also, the vehicle may be a vehicle having only an engine, the vehicle may also be a hybrid vehicle, a plug-in hybrid vehicle, or the like.

The cooling system 1 is configured by connecting an engine 2 (ENG), a water pump 3 (W/P), a radiator 4 (RAD), a heat exchanger 5 (H/EX), a heater core 6 (HTR), an exhaust gas recirculation (EGR) cooler 7 (EGR), and a control valve 8 (EWV) with various flow paths 10 to 14.

The water pump 3, the engine 2, and the control valve 8 are connected to each other in order from an upstream side to a downstream side of a main flow path 10. In the main flow path 10, the water pump 3 is operated to cause cooling water (liquid) to pass through the engine 2 and the control valve 8 in order.

A radiator flow path 11, a warm-up flow path 12, an air conditioning flow path 13 and an EGR flow path 14 are each connected to the main flow path 10. The radiator flow path 11, the warm-up flow path 12, the air conditioning flow path 13, and the EGR flow path 14 connect portions on an upstream side of the water pump 3 in the main flow path 10 and with the control valve 8.

The radiator 4 is connected to the radiator flow path 11. With the radiator flow path 11, heat exchange between the cooling water and the outside air in the radiator 4 is performed.

The heat exchanger 5 is connected to the warm-up flow path 12. Engine oil circulates between the heat exchanger 5 and the engine 2 through an oil flow path 18. With the warm-up flow path 12, heat exchange between the cooling water and the engine oil in the heat exchanger 5 is performed. That is, the heat exchanger 5 functions as an oil warmer when a water temperature is higher than an oil temperature and heats the engine oil. On the other hand, the heat exchanger 5 functions as an oil cooler when the water temperature is lower than the oil temperature and cools the engine oil.

The heater core 6 is connected to the air conditioning flow path 13. The heater core 6 is provided, for example, in a duct (not shown) of an air conditioner. With the air conditioning flow path 13, heat exchange between the cooling water and conditioning air, which flows in the duct, in the heater core 6 is performed.

The EGR cooler 7 is connected to the EGR flow path 14. With the EGR flow path 14, heat exchange between the cooling water and EGR gas in the EGR cooler 7 is performed.

In the cooling system 1 described above, the cooling water that has passed through the engine 2 in the main flow path 10 flows into the control valve 8 and is then selectively distributed to the various flow paths 11 to 13 in accordance with operations of the control valve 8. Thus, controls for an early temperature rise, a high water temperature (an optimum temperature), etc., can be realized, thereby achieving an improvement in fuel economy of a vehicle.

<Control Valve>

Figure 2:
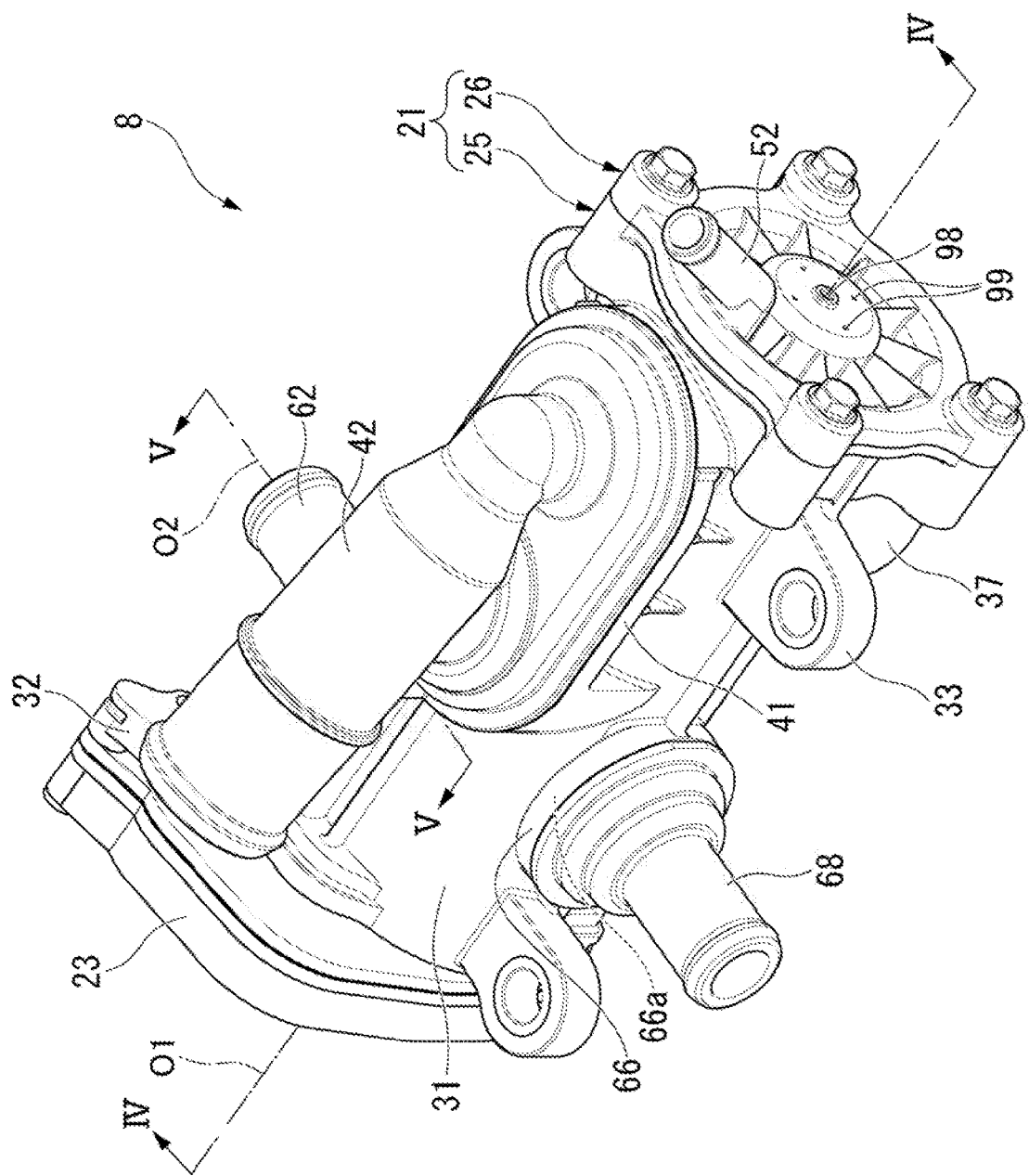
FIG. 2 is a perspective view of a control valve according to an embodiment.
Figure 3:
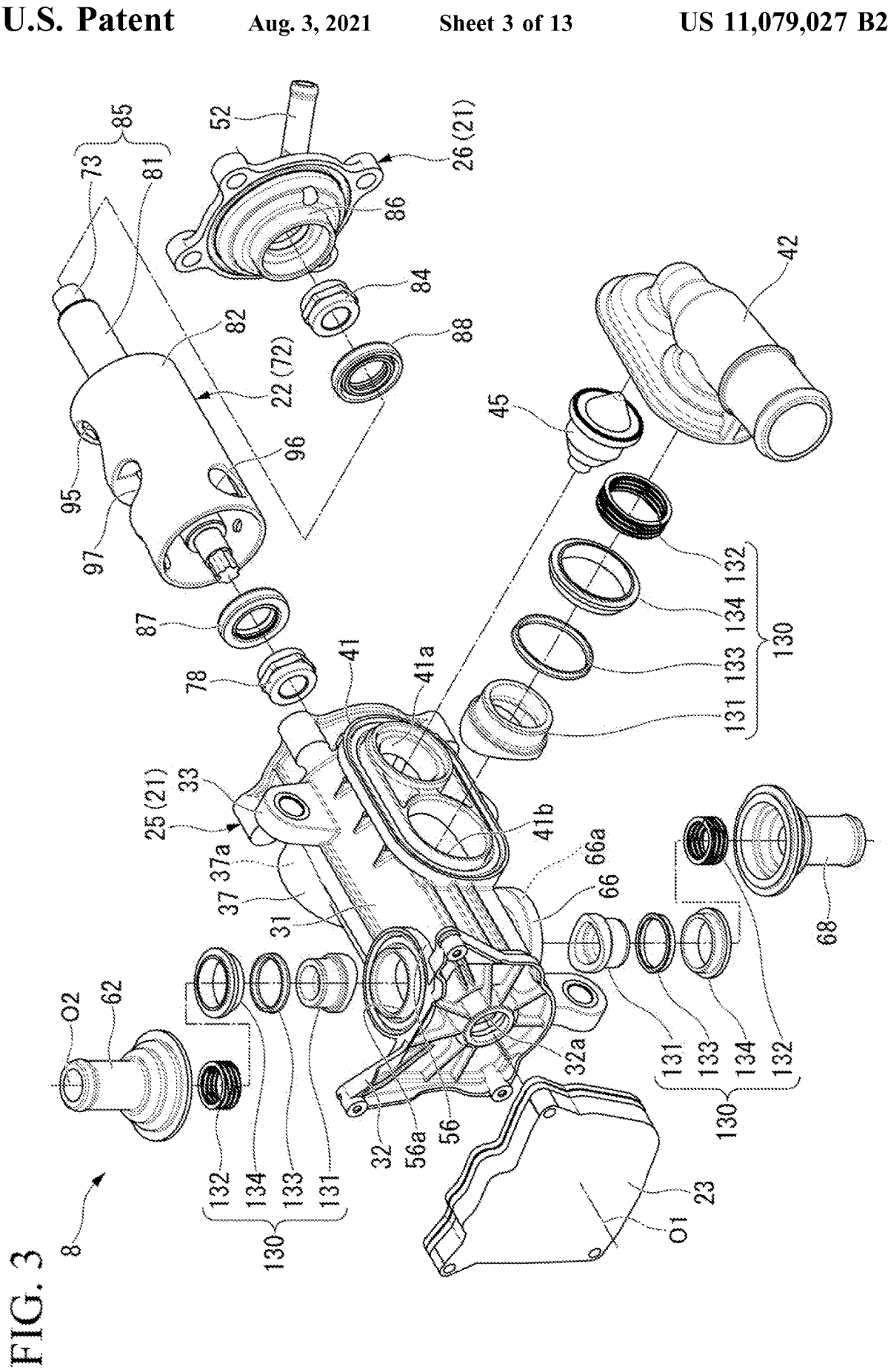
FIG. 3 is an exploded perspective view of the control valve according to the embodiment.

FIG. 2 is a perspective view of the control valve 8. FIG. 3 is an exploded perspective view of the control valve 8.

As shown in FIGS. 2 and 3, the control valve 8 mainly includes a casing 21, a valve body 22 (see FIG. 3), and a drive unit 23.

<Casing>

The casing 21 has a bottomed cylindrical casing body 25 and a lid body 26 that closes an opening portion of the casing body 25. Also, in the following description, a direction along an axis O1 of the casing 21 is simply referred to as a case axis direction. In the case axis direction, a side toward a bottom wall portion 32 of the casing body 25 with respect to a case circumferential wall 31 of the casing body 25 is referred to as a first side, and a side toward the lid body 26 with respect to the case circumferential wall 31 of the casing body 25 is referred to as a second side. Further, a direction orthogonal to the axis O1 is referred to as a case radial direction, and a direction around the axis O1 is referred to as a case circumferential direction.

A plurality of attachment pieces 33 are formed on the case circumferential wall 31 of the casing body 25. Each attachment piece 33 protrudes outward in the case radial direction from the case circumferential wall 31. The control valve 8 is fixed in an engine room via the attachment pieces 33, for example. Also, positions, numbers, and the like of the respective attachment pieces 33 can be changed as appropriate.

Figure 4:
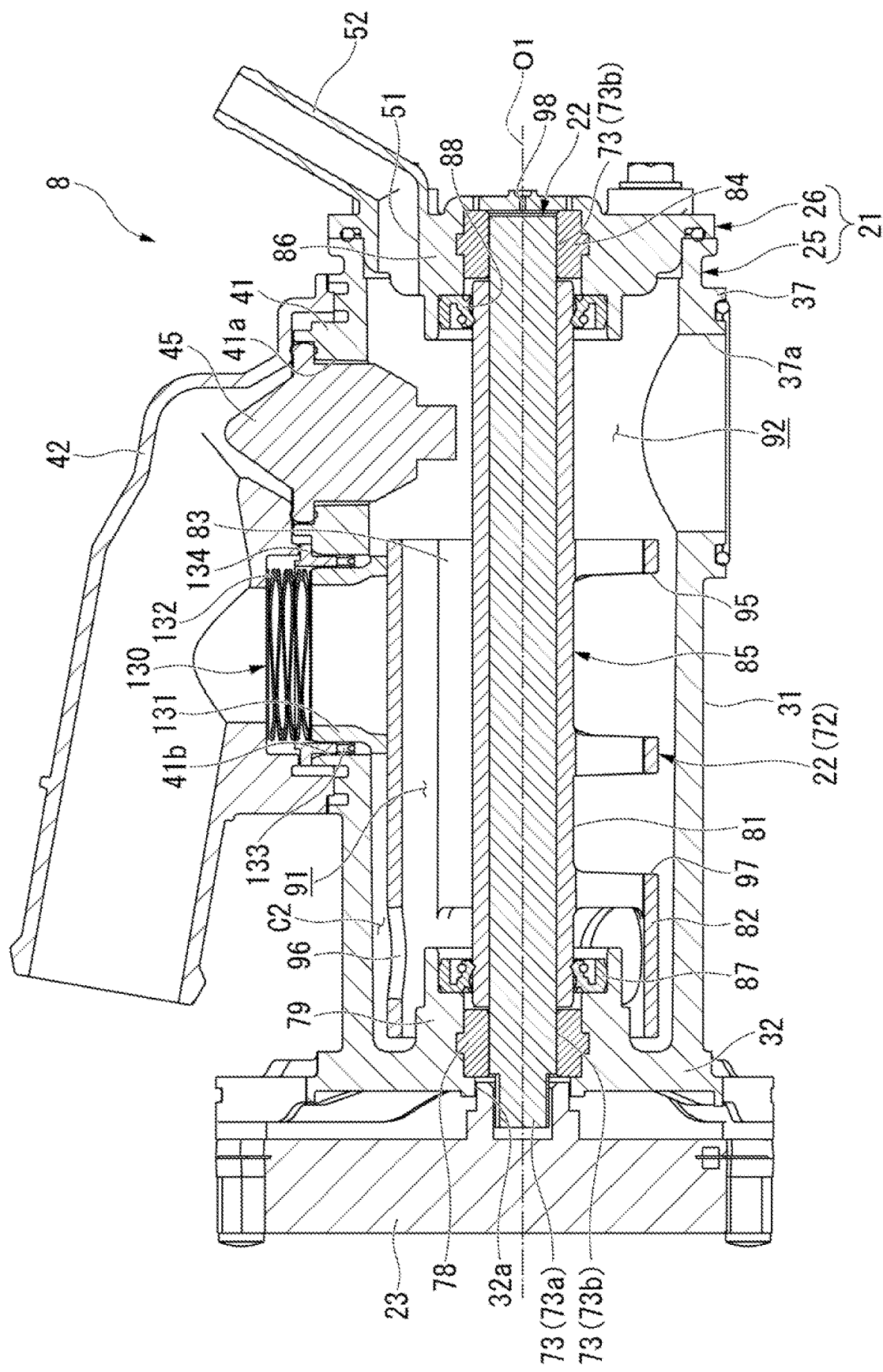
FIG. 4 is a cross-sectional view along line IV-IV of FIG. 2.

FIG. 4 is a cross-sectional view along line IV-IV of FIG. 2.

As shown in FIGS. 3 and 4, an inflow port 37 that protrudes outward in the case radial direction is formed in a portion positioned on the second side of the case circumferential wall 31. An inlet 37a (see FIG. 4) penetrating the inflow port 37 in the case radial direction is formed in the inflow port 37. The inlet 37a provides communication with an inside and an outside of the casing 21. The main flow path 10 (see FIG. 1) described above is connected to an end face of an opening (an outer end face in the case radial direction) of the inflow port 37.

As shown in FIG. 4, a radiator port 41 protruding outward in the case radial direction is formed on the case circumferential wall 31 at a position opposite to the inflow port 37 across the axis O1 in the case radial direction. A fail opening 41a and a radiator outlet 41b (an outlet) are formed in the radiator port 41 side by side in the case axial direction. The fail opening 41a and the radiator outlet 41b both penetrate the radiator port 41 in the case radial direction. In the present embodiment, the fail opening 41a is opposed to the aforementioned inlet 37a in the case radial direction. Also, the radiator outlet 41b is positioned on the first side in the case axial direction with respect to the fail opening 41a.

A radiator joint 42 is connected to an end face of an opening (an outer end face in the case radial direction) of the radiator port 41. The radiator joint 42 provides connection between the radiator outlet 41b and an upstream end portion of the radiator flow path 11 (see FIG. 1). Further, the radiator joint 42 is welded (for example, by vibration welding and the like) to the end face of the opening of the radiator port 41.

A thermostat 45 is provided in the fail opening 41a. The thermostat 45 is opposed to the aforementioned inlet 37a in the case radial direction. The thermostat 45 opens and closes the fail opening 41a in accordance with a temperature of the cooling water flowing in the casing 21.

An EGR outlet 51 is formed in a portion of the lid body 26 that is positioned closer to the radiator port 41 in the case radial direction with respect to the axis O1. The EGR outlet 51 penetrates the lid body 26 in the case axis direction. In the present embodiment, the EGR outlet 51 intersects (perpendicularly) in an opening direction (case radial direction) of the fail opening 41a. Also, the EGR outlet 51 at least partially overlaps the thermostat 45 in a front view seen in the case axis direction.

In the lid body 26, an EGR joint 52 is formed at an edge of an opening of the EGR outlet 51. The EGR joint 52 is formed in a tubular shape that extends further outward in the case radial direction toward the second side in the case axis direction and connects the EGR outlet 51 and an upstream end portion of the aforementioned EGR flow path 14 (see FIG. 1).

As shown in FIG. 3, the warm-up port 56 that protrudes outward in the case radial direction is formed in a portion of the case circumferential wall 31 that is positioned on the first side in the case axis direction with respect to the radiator port 41. A warm-up outlet 56a (an outlet) that penetrates the warm-up port 56 in the case radial direction is formed in the warm-up port 56. A warm-up joint 62 is connected to an end face of an opening of the warm-up port 56. The warm-up joint 62 connects the warm-up outlet 56a and an upstream end portion of the aforementioned warm-up flow path 12 (see FIG. 1). Also, the warm-up joint 62 is welded (for example, by vibration welding and the like) to the end face of the opening of the warm-up port 56.

As shown in FIGS. 2 and 3, an air conditioning port 66 is formed in the case circumferential wall 31 between the radiator port 41 and the warm-up port 56 in the case axis direction and at a position shifted about 180 degrees in the case circumferential direction with respect to the warm-up port 56. An air conditioning outlet 66a (an outlet) that penetrates the air conditioning port 66 in the case radial direction is formed in the air conditioning port 66. An air conditioning joint 68 is connected to an end face of an opening of the air conditioning port 66. The air conditioning joint 68 connects the air conditioning outlet 66a and an upstream end portion of the aforementioned air conditioning flow path 13 (see FIG. 1). Also, the air conditioning joint 68 is welded (for example, by vibration welding and the like) to the end face of the opening of the air conditioning port 66.

<Drive Unit>

As shown in FIG. 2, the drive unit 23 is attached to the bottom wall portion 32 of the casing body 25. In the drive unit 23, a motor, a speed reduction mechanism, a control board, and the like (not shown) are accommodated in a unit case.

<Valve Body>

As shown in FIGS. 3 and 4, the valve body 22 is accommodated in the casing 21. The valve body 22 is formed in a cylindrical shape and is disposed coaxially with the axis O1 of the casing 21 inside the casing 21. The valve body 22 rotates around the axis O1, thereby opening and closing the above-described outlets (the radiator outlet 41b, the warm-up outlet 56a, and the air conditioning outlet 66a).

As shown in FIG. 4, the valve body 22 is configured by insert molding an inner shaft portion 73 inside a rotor main body 72. The inner shaft portion 73 extends coaxially with the axis O1.

A first side end portion of the inner shaft portion 73 penetrates the bottom wall portion 32 in the case axis direction through a through hole (an atmosphere opening portion) 32a formed in the bottom wall portion 32. The first side end portion of the inner shaft portion 73 is rotatably supported by a first bush (a first bearing) 78 provided on the bottom wall portion 32 described above.

Specifically, a first shaft receiving wall 79 is formed on the bottom wall portion 32 toward the second side in the case axis direction. The first shaft receiving wall 79 surrounds the through hole 32a described above. The aforementioned first bush 78 is fitted inside the first shaft receiving wall 79.

A connection portion 73a is formed in a portion of the inner shaft portion 73 that is positioned on the first side in the case axis direction from the first bush 78 (a portion that is positioned outside the bottom wall portion 32). The connection portion 73a is connected to the aforementioned drive unit 23 outside the casing 21.

Thus, the power of the drive unit 23 is transmitted to the inner shaft portion 73. A second side end portion of the inner shaft portion 73 is rotatably supported by a second bush (a second bearing) 84 provided in the lid body 26 described above. Specifically, a second shaft receiving wall 86 is formed on the lid body 26 toward the first side in the case axis direction. The second shaft receiving wall 86 surrounds the axis O1 at a position inward in the case radial direction from the EGR outlet 51 described above. The aforementioned second bush 84 is fitted inside the second shaft receiving wall 86.

The rotor main body 72 surrounds the inner shaft portion 73 described above. The rotor main body 72 has an outer shaft portion 81 which covers the inner shaft portion 73, a circumferential wall portion 82 which surrounds the outer shaft portion 81, and a spoke portion 83 which connects the outer shaft portion 81 and the circumferential wall portion 82.

The outer shaft portion 81 surrounds the entire circumference of the inner shaft portion 73 in a state where both end portions of the inner shaft portion 73 in the case axis direction are exposed. In the present embodiment, a rotational shaft 85 of the valve body 22 is configured of the outer shaft portion 81 and the inner shaft portion 73.

In the first shaft receiving wall 79 described above, a first lip seal 87 is provided at a portion positioned on the second side in the case axis direction with respect to the first bush 78. The first lip seal 87 seals between an inner circumferential surface of the first shaft receiving wall 79 and an outer circumferential surface of the rotational shaft 85 (outer shaft portion 81). A portion of the first shaft receiving wall 79 positioned on the first side in the case axis direction with respect to the first lip seal 87 opens to the atmosphere through the through hole 32a.

On the other hand, a second lip seal 88 is provided in a portion positioned on the first side in the case axis direction with respect to the second bush 84 in the second shaft receiving wall 86 described above. The second lip seal 88 seals between an inner circumferential surface of the second shaft receiving wall 86 and the outer circumferential surface of the rotational shaft 85 (outer shaft portion 81). The lid body 26 is formed with a through hole (atmosphere opening portion) 98 that penetrates the lid body 26 in the case axis direction.

The circumferential wall portion 82 of the valve body 22 is disposed coaxially with the axis O1. The circumferential wall portion 82 is disposed in a portion of the casing 21 that is positioned on the first side in the case axis direction with respect to the inlet 37a. Specifically, the circumferential wall portion 82 is disposed at a position in the case axis direction which avoids the fail opening 41a and straddles the radiator outlet 41b, the warm-up outlet 56a, and the air conditioning outlet 66a. An inner side of the circumferential wall portion 82 constitutes a flow passage 91 through which the cooling water that has flowed inside the casing 21 through the inlet 37a flows in the case axis direction. On the other hand, in the casing 21, a portion positioned on the second side in the case axis direction with respect to the circumferential wall portion 82 constitutes a connection flow path 92 communicating with the flow passage 91. Further, a gap C2 is provided in the case radial direction between an outer circumferential surface of the circumferential wall portion 82 and an inner circumferential surface of the case circumferential wall 31.

In the circumferential wall portion 82, a valve hole 95 penetrating the circumferential wall portion 82 in the case radial direction is formed at the same position in the case axis direction as the radiator outlet 41b described above. When the valve hole 95 at least partially overlaps a seal cylinder member 131 inserted into the radiator outlet 41b when viewed in the case radial direction, the inner side of the circumferential wall portion 82 (flow passage 91) and the radiator outlet 41b communicates with each other through the valve hole 95.

In the circumferential wall portion 82, another valve hole 96 penetrating the circumferential wall portion 82 in the case radial direction is formed at the same position in the case axis direction as the warm-up outlet 56a described above. When the valve hole 96 at least partially overlaps a seal cylinder member 131 inserted into the warm-up outlet 56a when viewed in the case radial direction, the inner side of the circumferential wall portion 82 (flow passage 91) and the warm-up outlet 56a communicate with each other through the valve hole 96.

In the circumferential wall portion 82, another valve hole 97 penetrating the circumferential wall portion 82 in the case radial direction is formed at the same position in the case axis direction as the air conditioning outlet 66a described above. When the valve hole 97 at least partially overlaps a seal cylinder member 131 inserted into the air conditioning outlet 66a when viewed in the case radial direction, the inner side of the circumferential wall portion 82 (flow passage 91) and the air conditioning outlet 66a communicate with each other through the valve hole 97.

Also, detailed structures of circumferential edge portions of the valve hole 97 for the air conditioning flow path and the valve hole 96 for the warm-up flow path formed in the circumferential wall portion 82 will be described later.

As the valve body 22 rotates around the axis O1, it switches between communication and blocking between the valve holes 95, 96, and 97 and the corresponding outlets 41b, 56a, and 66a. Also, the pattern of communication between the valve holes 95, 96, and 97 and the outlets 41b, 56a, and 66a can be set as appropriate.

Next, details of a connection portion between the warm-up port 56 and the warm-up joint 62 will be described. Also, since a connection portion between the radiator port 41 and the radiator joint 42 and a connection portion between the air conditioning port 66 and the air conditioning joint 68 have the same configuration as the connection portion between the warm-up port 56 and the warm-up joint 62, descriptions thereof will be omitted.

Figure 5:
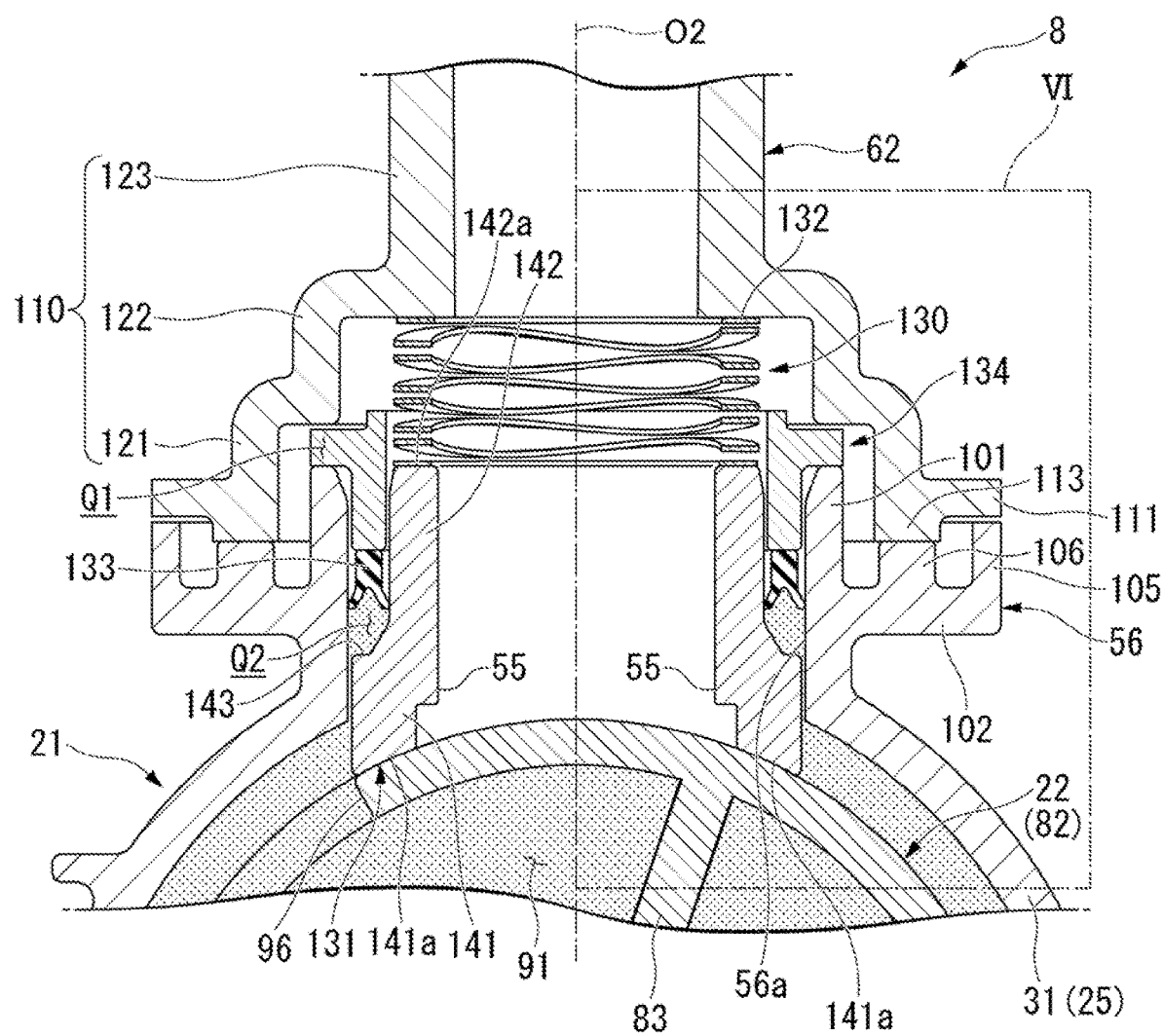
FIG. 5 is an enlarged view along line V-V of FIG. 2.

FIG. 5 is an enlarged cross-sectional view corresponding to line V-V of FIG. 2. In the following description, a direction along an axis O2 of the warm-up outlet 56a may be referred to as a port axis direction (a first direction). In this case, in the port axis direction, a direction toward the axis O1 with respect to the warm-up port 56 is referred to as inward, and a direction away from the axis O1 with respect to the warm-up port 56 is referred to as outward. Also, a direction orthogonal to the axis O2 may be referred to as a port radial direction (a second direction), and a direction around the axis O2 may be referred to as a port circumferential direction.

As shown in FIG. 5, the warm-up port 56 has a seal cylinder portion 101 which extends in the port axis direction, and a port flange portion 102 which protrudes outward from the seal cylinder portion 101 in the port radial direction. The inside of the seal cylinder portion 101 constitutes the warm-up outlet 56a (an outlet) described above. In the present embodiment, an inner diameter of the seal cylinder portion 101 is made uniform in a region excluding an outer end portion thereof in the port axis direction.

A surrounding wall 105 protruding outward in the port axis direction is formed at an outer circumferential portion of the port flange portion 102. The surrounding wall 105 is formed over the entire circumference of the port flange portion 102. In the port flange portion 102, a port joining portion 106 protruding outward in the port axis direction is formed at a portion positioned inward in the port radial direction from the surrounding wall 105.

The port joining portion 106 is formed over the entire circumference of the port flange portion 102.

The warm-up joint 62 has a joint cylinder portion 110 disposed coaxially with the axis O2, and a joint flange portion 111 protruding outward in the port radial direction from an inner end portion of the joint cylinder portion 110 in the port axis direction.

The joint flange portion 111 is formed in an annular shape having an outer diameter equal to that of the port flange portion 102 and an inner diameter larger than an outer diameter of the seal cylinder portion 101. The joint joining portion 113 protruding inward in the port axis direction is formed on an inner circumferential portion of the joint flange portion 111. The joint joining portion 113 faces the port joining portion 106 in the port axis direction.

The warm-up port 56 and the warm-up joint 62 are joined to each other by vibration welding of opposing surfaces of the port joining portion 106 and the joint joining portion 113.

The joint cylinder portion 110 extends from an inner circumferential edge of the joint flange portion 111 outward in the port axis direction. The joint cylinder portion 110 is formed in a multistage cylinder shape whose diameter is reduced stepwise outward in the port axis direction. Specifically, the joint cylinder portion 110 has a large diameter portion 121, a medium diameter portion 122, and a small diameter portion 123 which are connected to each other in order outward in the port axis direction.

The large diameter portion 121 surrounds the seal cylinder portion 101 with a gap outward in the port radial direction with respect to the seal cylinder portion 101. The medium diameter portion 122 is opposed to the seal cylinder portion 101 with a gap Q1 therebetween in the port axis direction.

A seal mechanism 130 is provided at a portion surrounded by the warm-up port 56 and the warm-up joint 62. The seal mechanism 130 includes the seal cylinder member 131, a biasing member 132, a seal ring 133, and a holder 134. Further, as shown in FIG. 3, sealing mechanisms 130 having the same configuration as that of the sealing mechanism 130 provided in the warm-up port 56 are also provided in the radiator port 41 and the air conditioning port 66 described above. In the description of the present embodiment, the seal mechanisms 130 provided in the radiator port 41 and the air conditioning port 66 are denoted by the same reference numerals as those of the seal mechanism 130 provided in the warm-up port 56, and the description thereof will be omitted.

As shown in FIG. 5, the seal cylinder member 131 is inserted into the warm-up outlet 56a. The seal cylinder member 131 has a circumferential wall extending coaxially with the axis O2. The circumferential wall of the seal cylinder member 131 is formed in a multistage cylinder shape whose outer diameter is reduced stepwise outward in the port axis direction. Specifically, the circumferential wall of the seal cylinder member 131 has a first cylindrical portion 142 that is positioned outward in the port axis direction (on one axial end side) and communicates with a downstream side of the warm-up outlet 56a, and a second cylindrical portion 141 that is positioned inward in the port axial direction (the other axial end side) and has larger inner and outer diameters than those of the first cylindrical portion 142.

In the seal cylinder member 131, the second cylindrical portion 141 having a larger diameter is slidably inserted into an inner circumferential surface of the seal cylinder portion 101. An inner end face of the second cylindrical portion 141 in the port axis direction constitutes a valve sliding contact surface 141a that slidably abuts the outer circumferential surface of the circumferential wall portion 82 of the valve body 22. Also, in the present embodiment, the valve sliding contact surface 141a is a curved surface formed to conform to a radius of curvature of the outer circumferential surface of the circumferential wall portion 82.

An outer circumferential surface of the first cylindrical portion 142 is connected to an outer circumferential surface of the second cylindrical portion 141 through a step surface 143. The step surface 143 is inclined outward in the port radial direction as it goes inward in the port axis direction, and then further extends outward in the port radial direction. Therefore, a seal gap Q2 is provided in the port radial direction between the outer circumferential surface of the first cylindrical portion 142 having a smaller diameter and the inner circumferential surface of the seal cylinder portion 101.

An outer end face (hereinafter referred to as a "seat surface 142a") of the first cylindrical portion 142 in the port axis direction is a flat surface orthogonal to the port axis direction. The seat surface 142a of the first cylindrical portion 142 is disposed at a position equivalent to an outer end face of the seal cylinder portion 101 in the port axis direction. Also, the seal cylinder member 131 is separated from the warm-up joint 62 in the port radial direction and the port axis direction.

The biasing member 132 is interposed between the seat surface 142a of the seal cylinder member 131 and an inner end face of the small diameter portion 123 of the warm-up joint 62 in the port axis direction. The biasing member 132 is a wave spring, for example. The biasing member 132 biases the seal cylinder member 131 inward in the port axis direction (toward the circumferential wall portion 82).

The seal ring 133 is, for example, a Y packing. The seal ring 133 is externally inserted into the first cylindrical portion 142 of the seal cylinder member 131 with an opening portion (forked portion) thereof facing inward in the port axis direction. Specifically, in a state where the seal ring 133 is disposed in the seal gap Q2 described above, tip portions of the forked portion are slidably in close contact with the outer circumferential surface of the first cylindrical portion 142 and the inner circumferential surface of the seal cylinder portion 101, respectively. Further, in the seal gap Q2, a hydraulic pressure in the casing 21 is introduced into a region inward in the port axis direction with respect to the seal ring 133 through a gap between the inner circumferential surface of the seal cylinder portion 101 and the second cylindrical portion 141 of the seal cylinder member 131. The step surface 143 is formed to face in a direction opposite to the valve sliding contact surface 141a of the seal cylinder member 131 in the port axis direction. The step surface 143 constitutes a pressure receiving surface that receives a hydraulic pressure of the cooling water in the casing 21 and is pressed inward in the port axis direction.

Figure 6:
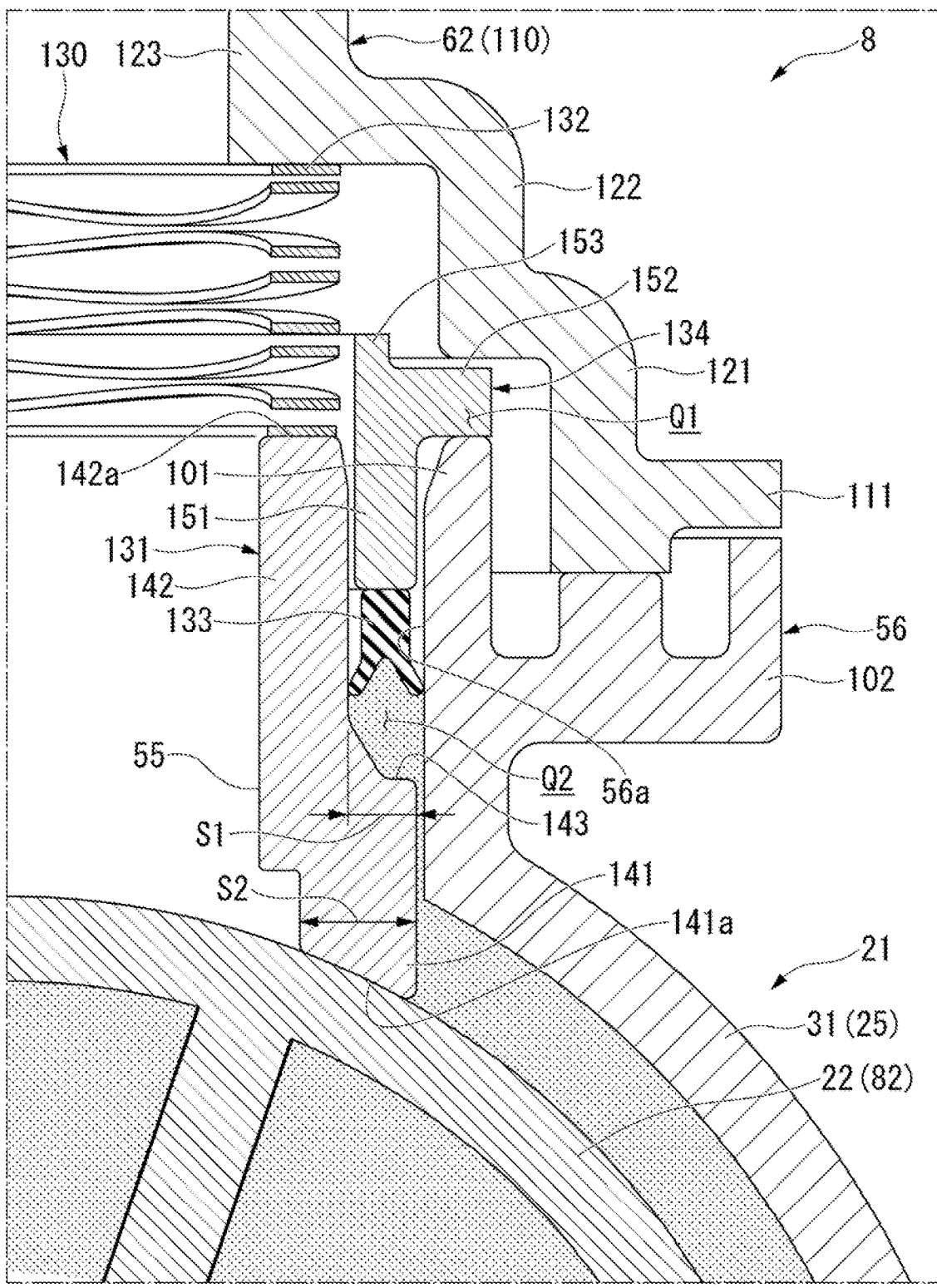
FIG. 6 is an enlarged view of portion VI of FIG. 5.

FIG. 6 is an enlarged view of portion VI of FIG. 5.

Here, in the seal cylinder member 131, an area S1 of the step surface 143 and an area S2 of the valve sliding contact surface 141a are set to satisfy the following equations (1) and (2).

$$S1 < S2 \leq S1/k \tag{1}$$

$$a \leq k < 1 \tag{2}$$

K: Pressure reduction constant of cooling water flowing through a minute gap between the valve sliding contact surface 141a and the circumferential wall portion 82 of the valve body 22

α: Lower limit value of the pressure reduction constant determined by physical properties of cooling water Also, the area S1 of the step surface 143 and the area S2 of the valve sliding contact surface 141a indicate areas when projected in the port axis direction.

The value a in the equation (2) is a standard value of a pressure reduction constant determined by a type of cooling water, a use environment (for example, temperature), and the like. For example, α=½ in the case of water under normal use conditions. When physical properties of cooling water for use changes, the value changes to α=⅓, etc.

Further, when the valve sliding contact surface 141a uniformly comes into contact with the circumferential wall portion 82 from an outer edge to an inner edge thereof in the port radial direction, the pressure reduction constant k in the equation (2) is a (for example, ½) that is a standard value of the pressure reduction constant. However, a gap between an outer circumferential portion of the valve sliding contact surface 141a and the circumferential wall portion 82 may slightly increase with respect to an inner circumferential portion of the valve sliding contact surface 141a due to a manufacturing error or an assembly error of the seal cylinder member 131. In this case, the pressure reduction constant k in the equation (2) gradually approaches k=1.

In the present embodiment, on the premise that there is a minute gap between the valve sliding contact surface 141a of the seal cylinder member 131 and the outer circumferential surface of the circumferential wall portion 82 to allow sliding therebetween, the relationship between the areas S1 and S2 of the step surface 143 and the valve sliding contact surface 141a is determined by the equations (1) and (2).

That is, as described above, the pressure of the cooling water in the casing 21 as it is acts on the step surface 143 of the seal cylinder member 131. On the other hand, the pressure of the cooling water in the casing 21 as it is does not act on the valve sliding contact surface 141a. Specifically, when the cooling water flows through the minute gap between the valve sliding contact surface 141a and the circumferential wall portion 82 from the outer edge toward the inner edge in the port radial direction, the pressure of the cooling water acts while being accompanied by a decrease in pressure. At this time, the pressure of the cooling water gradually decreases inward in the port radial direction, and tries to push up the seal cylinder member 131 outward in the port axis direction. As a result, a force obtained by multiplying the area S1 of the step surface 143 by the pressure P in the casing 21 as it is acts on the step surface 143 of the seal cylinder member 131. On the other hand, a force obtained by multiplying the area S2 of the valve sliding contact surface 141a by the pressure P in the casing 21 and the pressure reduction constant k acts on the valve sliding contact surface 141a of the seal cylinder member 131.

The areas S1 and S2 of the control valve 8 of the present embodiment are set such that k×S2≤S1 is established as is apparent from the equation (1). For this reason, the relationship of P×k×S2≤P×S1 is also established.

Accordingly, a force F1 (F1=P×S1) acting on the step surface 143 of the seal cylinder member 131 in a pressing direction becomes equal to or larger than a force F2 (F2=P×k×S2) acting on the valve sliding contact surface 141a of the seal cylinder member 131 in a floating direction. Therefore, in the control valve 8 of the present embodiment, a space between the seal cylinder member 131 and the circumferential wall portion 82 can be sealed only by the relations in pressure of the cooling water in the casing 21.

On the other hand, in the present embodiment, as described above, the area S1 of the step surface 143 of the seal cylinder member 131 is smaller than the area S2 of the valve sliding contact surface 141a. For that reason, even if the pressure of the cooling water in the casing 21 increases, the valve sliding contact surface 141a of the seal cylinder member 131 can be inhibited from being pressed against the circumferential wall portion 82 with an excessive force. Therefore, when the control valve 8 of the present embodiment is adopted, an increase in the size and output of the drive unit 23 that rotationally drives the valve body 22 can be avoided, and early wear of the seal cylinder member 131 and the bushes 78 and 84 (see FIG. 4) can be inhibited.

As described above, in the present embodiment, the area S2 of the valve sliding contact surface 141a is set to be larger than the area S1 of the step surface 143 within a range in which the pressing force acting on the seal cylinder member 131 inward in the port axis direction does not fall below the floating force acting on the seal cylinder member 131 outward in the port axis direction. For that reason, it is possible to seal between the seal cylinder member 131 and the circumferential wall portion 82 while inhibiting the pressing of the seal cylinder member 131 against the circumferential wall portion 82 with an excessive force.

The holder 134 described above is configured to be movable in the port axis direction with respect to the warm-up port 56 and the warm-up joint 62 in the gap Q1. Further, the holder 134 is disposed in at least one of the warm-up port 56 and the warm-up joint 62 to be able to be separated in the port axis direction. The holder 134 has a holder cylinder portion 151, a holder flange portion 152, and a restriction portion 153.

The holder cylinder portion 151 extends in the port axis direction. The holder cylinder portion 151 is inserted into the seal gap Q2 from an outer side in the port axis direction. A bottom portion of the above-described seal ring 133 can be brought into contact with an inner end face of the holder cylinder portion 151 in the port axis direction. That is, the holder cylinder portion 151 restricts movement of the seal ring 133 outward in the port axis direction.

The holder flange portion 152 is provided to protrude outward in the port radial direction from an outer end portion of the holder cylinder portion 151 in the port axis direction. The holder flange portion 152 is disposed in the gap Q1 between the outer end face of the seal cylinder portion 101 in the port axis direction and an inner end face of the medium diameter portion 122 in the port axis direction. A movement of the holder 134 inward in the port axis direction is restricted by the seal cylinder portion 101, and a movement of the holder 134 outward in the port axis direction is restricted by the medium diameter portion 122.

The restriction portion 153 is formed to protrude in a cylindrical shape from an inner circumferential portion of the holder cylinder portion 151 outward in the port axis direction. The restriction portion 153 restricts movement of the biasing member 132 in the port radial direction in cooperation with the holder cylinder portion 151.

<Basic Operation of Control Valve>

Next, a basic operation of the control valve 8 described above will be described.

As shown in FIG. 1, in the main flow path 10, cooling water sent out by the water pump 3 is heat-exchanged in the engine 2 and then flows toward the control valve 8. As shown in FIG. 4, the cooling water that has passed through the engine 2 in the main flow path 10 flows into the connection flow path 92 in the casing 21 through the inlet 37a.

Some of the cooling water that has flowed into the connection flow path 92 flows into the EGR outlet 51. The cooling water that has flowed into the EGR outlet 51 passes through the EGR joint 52 and is supplied into the EGR flow path 14. The cooling water supplied into the EGR flow path 14 is returned to the main flow path 10 after heat exchange between the cooling water and the EGR gas is performed in the EGR cooler 7.

On the other hand, in the cooling water that has flowed into the connection flow path 92, the cooling water that has not flowed into the EGR outlet 51 flows into the flow passage 91 from the second side in the case axis direction. The cooling water that has flowed into the flow passage 91 is distributed to each outlet in the course of flowing through the flow passage 91 in the case axis direction. That is, the cooling water flowing into the flow passage 91 is distributed to the flow paths 11 to 13 through the outlets communicating with the corresponding valve holes among the outlets.

In the control valve 8, in order to switch the pattern of communication between the valve holes and the outlets, the valve body 22 is rotated around the axis O1. In addition, by stopping the rotation of the valve body 22 at a position corresponding to the pattern of communication that has been set, the valve holes communicate with the outlets in the pattern of communication corresponding to a stop position of the valve body 22.

<Detailed Structure Around Valve Hole of Valve Body>

Figure 7:
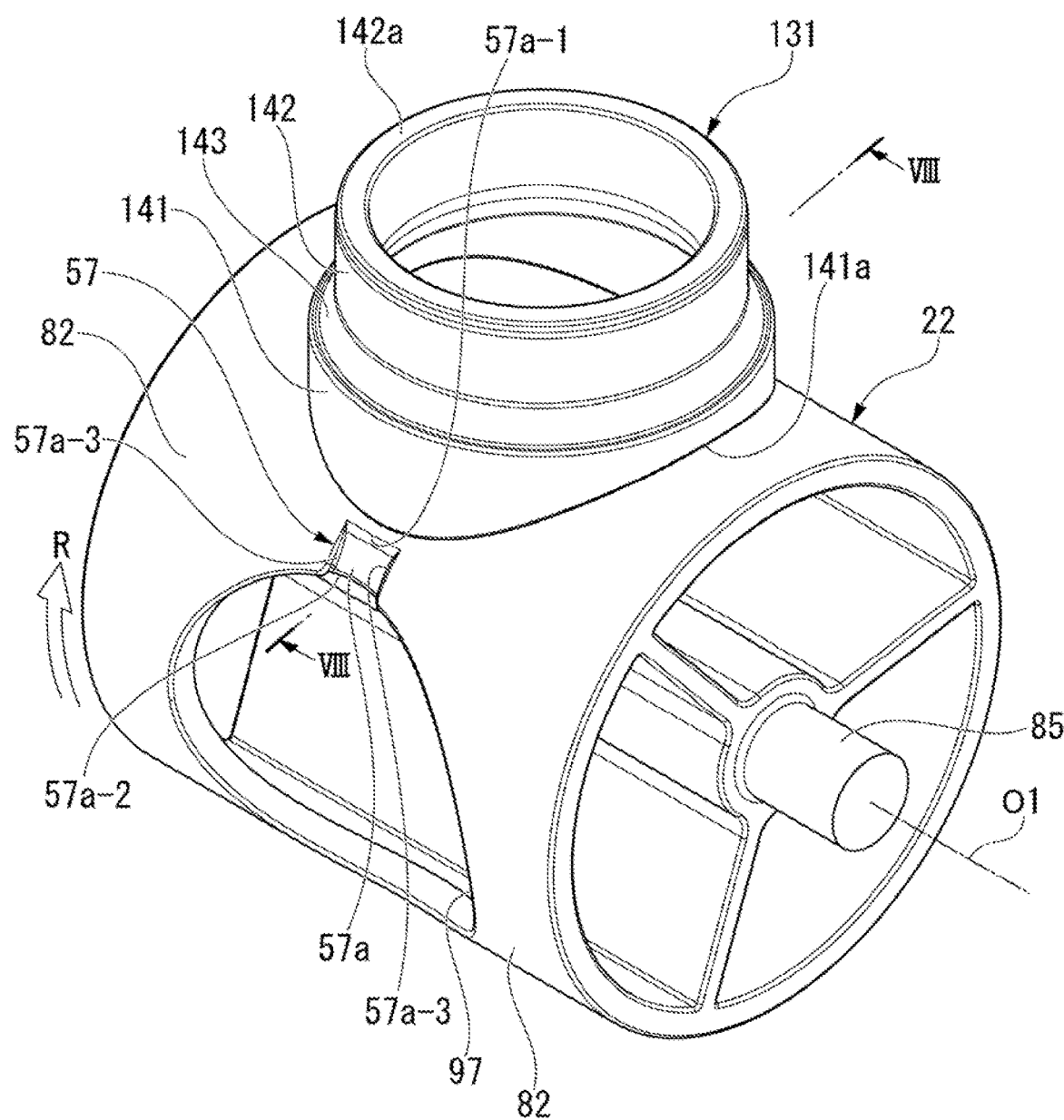
FIG. 7 is a perspective view showing a portion of a valve body and a seal cylinder member of the embodiment.
Figure 8:
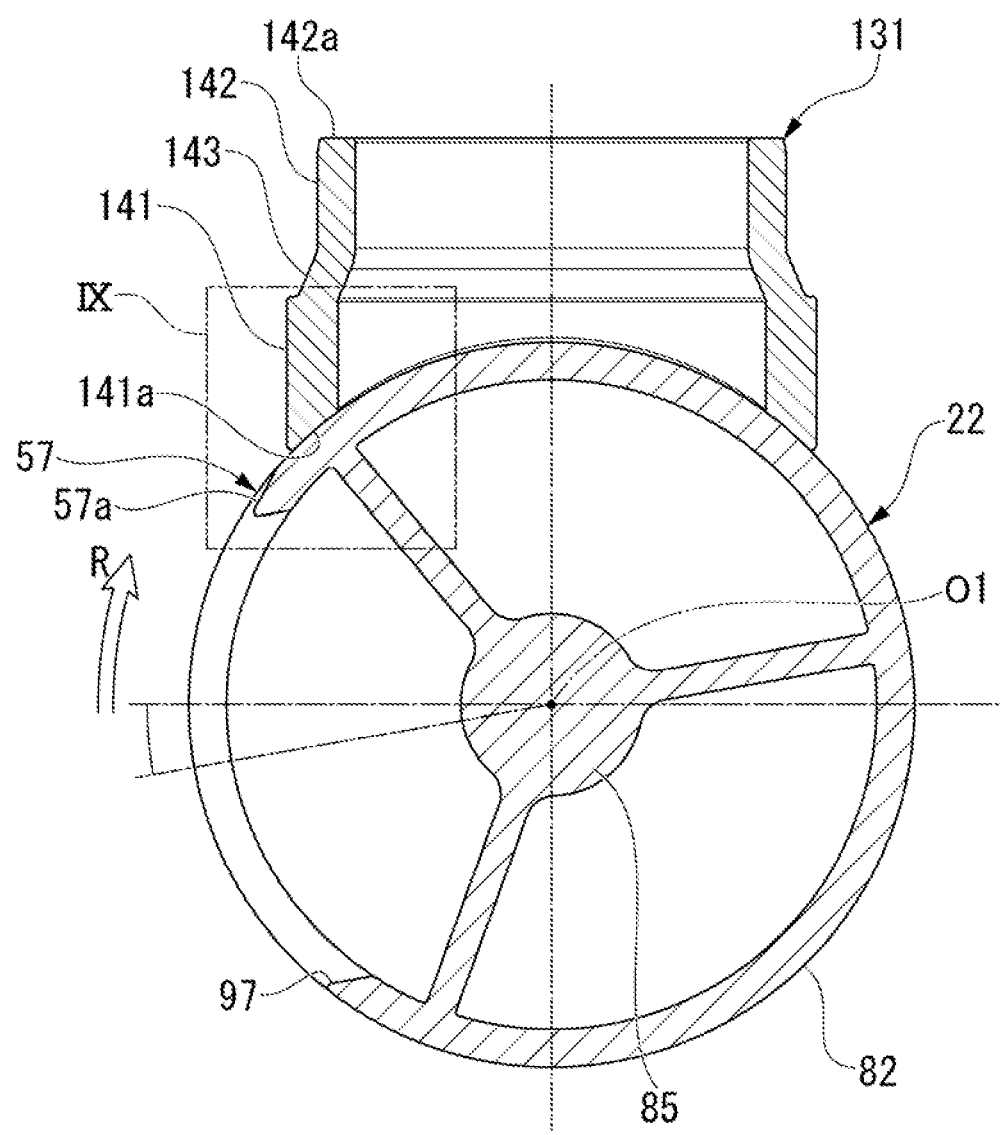
FIG. 8 is a cross-sectional view along line VIII-VIII of FIG. 7.
Figure 9:
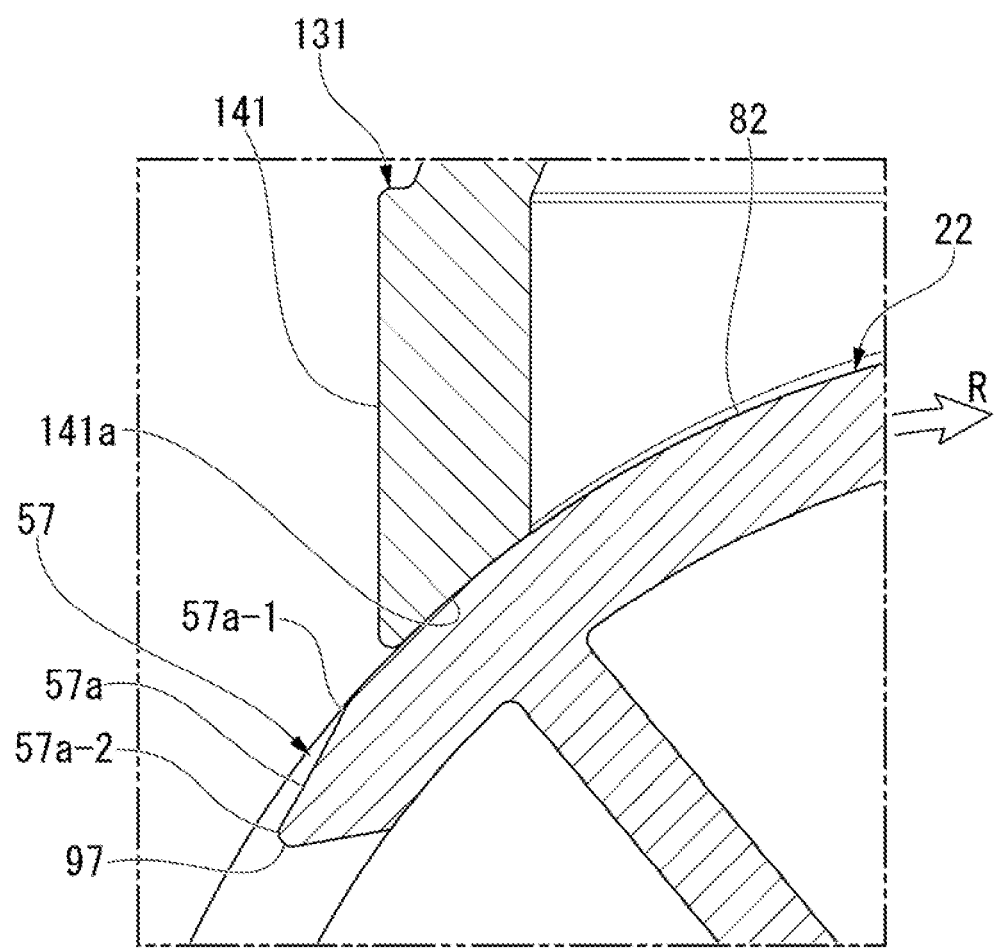
FIG. 9 is an enlarged view of portion IX of FIG. 8.
Figure 10:
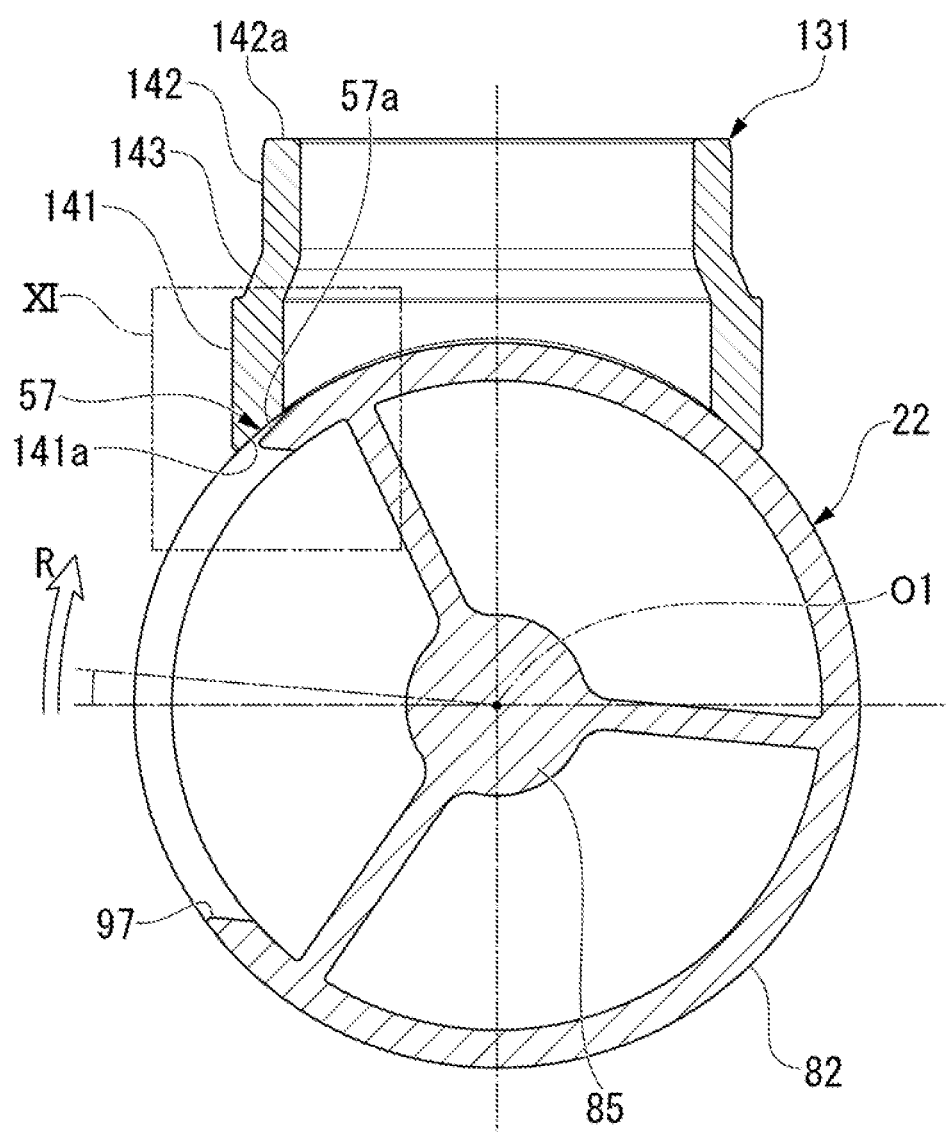
FIG. 10 is a cross-sectional view similar to FIG. 8 showing a state in which the valve body is rotated.
Figure 11:
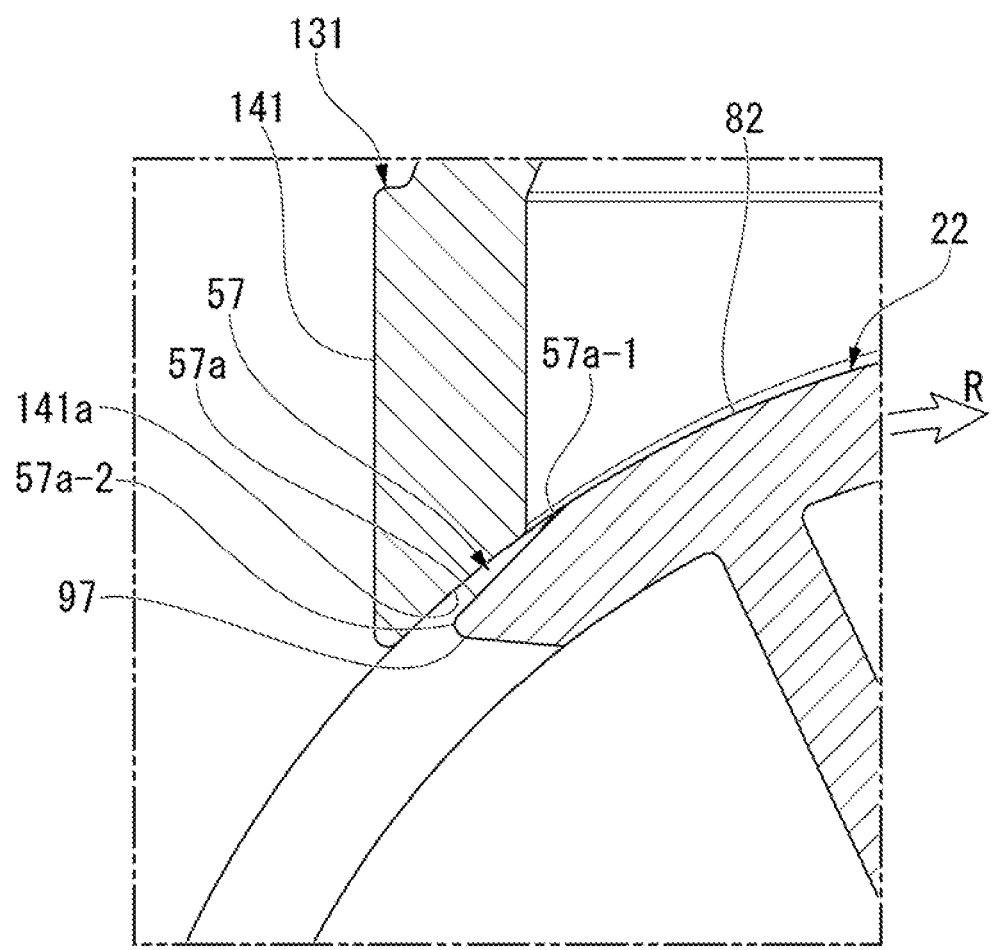
FIG. 11 is an enlarged view of portion XI of FIG. 10.

FIG. 7 is a perspective view of a portion of the valve body 22 and the seal cylinder member 131, and FIG. 8 is a cross-sectional view along line VIII-VIII of FIG. 7. Also, in FIG. 7, the valve body 22 is shown with a portion in an axial direction thereof cut out. FIG. 9 is an enlarged view of portion IX of FIG. 8. Also, FIG. 10 is a cross-sectional view similar to FIG. 8 showing a state in which the valve body 22 has rotated, and FIG. 11 is an enlarged view of portion XI of FIG. 10.

FIGS. 7 to 11 show a portion of the circumferential wall portion 82 of the valve body 22 which includes the valve hole 97 for the air conditioning flow path, and the seal cylinder member 131 of which communication and blocking is performed by the valve hole 97. The circumferential wall portion 82 of the valve body 22 is formed with a flow rate control groove 57 on a front side of an edge portion of the valve hole 97 in a rotating direction R of the valve body 22.

The flow rate control groove 57 has a bottom surface 57a which is recessed in the axis O1 direction of the valve body 22 with respect to the outer circumferential surface of the circumferential wall portion 82 and has one end portion that is continuous with the valve hole 97. The bottom surface 57a is formed in a substantially rectangular shape when viewed from the front, and only a side thereof facing the valve hole 97 is formed in substantially an arc shape by an inner circumferential surface of the valve hole 97. That is, the bottom surface 57a of the flow rate control groove 57 has a linear first end side 57a-1 parallel to the axis O1 of the valve body 22, a second end side 57a-2 facing the valve hole 97 at a position opposite to the first end side 57a-1, and a pair of lateral sides 57a-3 connecting end portions of the first end side 57a-1 and the second end side 57a-2 to each other. In the case of the present embodiment, the bottom surface 57a of the flow rate control groove 57 is inclined such that a depth of a recess thereof becomes deeper as it approaches the valve hole 97. An opening area of the flow rate control groove 57 gradually increases toward the valve hole 97. In the case of the present embodiment, the first end side 57a-1 of the bottom surface 57a is a boundary portion with the outer circumferential surface (the outer circumferential surface that is not recessed) of the circumferential wall portion 82. Also, in the present embodiment, although the second end side 57a-2 facing the valve hole 97 is formed in substantially an arc shape, the second end side 57a-2 does not necessarily have substantially an arc shape and may be formed in a linear shape, for example.

Figure 12:
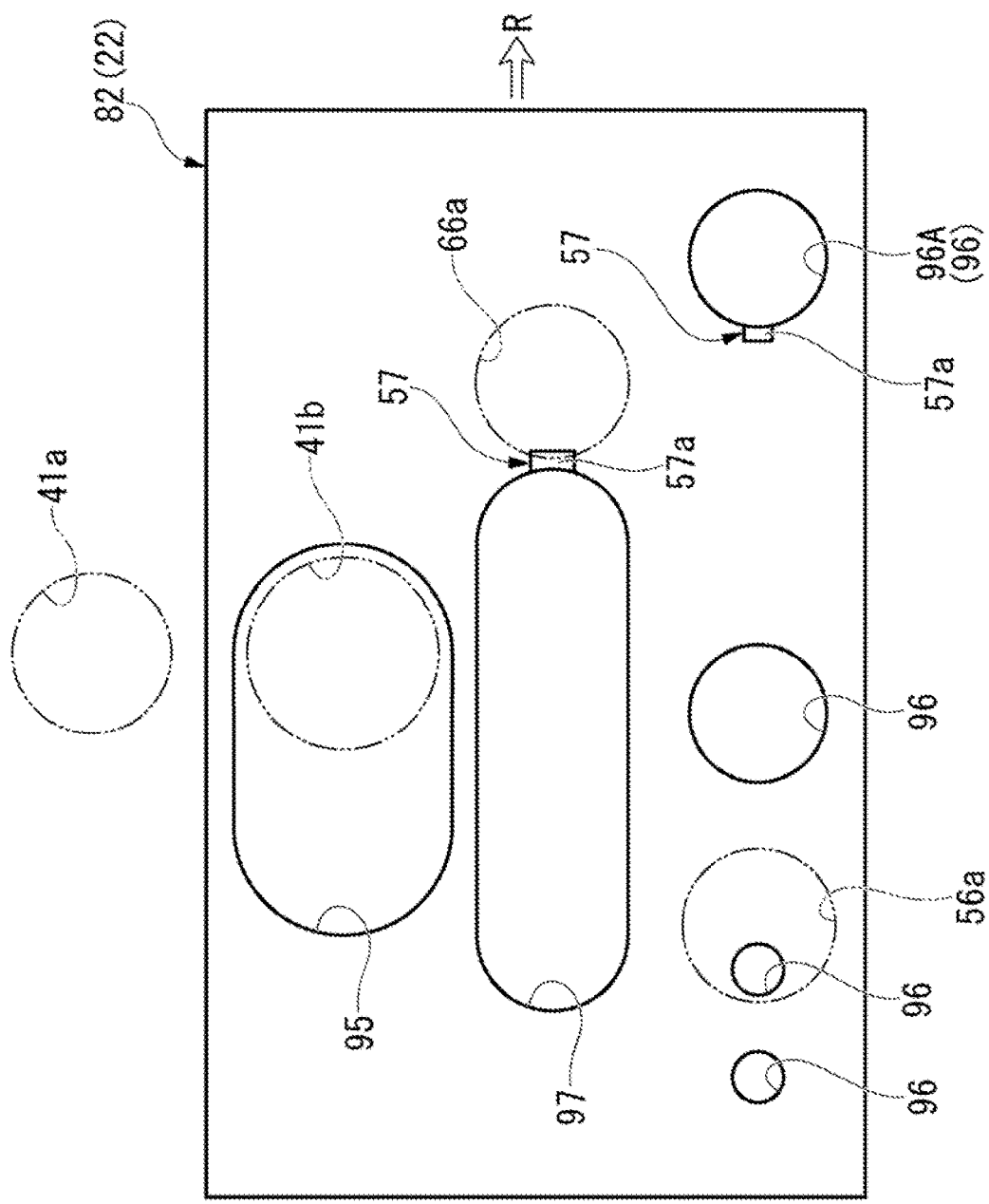
FIG. 12 is a schematic development view of a circumferential wall portion of the valve body according to the embodiment.

FIG. 12 is a schematic development view of the circumferential wall portion 82 of the valve body 22.

As shown in FIG. 12, the valve hole 95 for the radiator flow path has an oval shape in which a circumferential direction of the circumferential wall portion 82 is the major axis direction. On the other hand, the valve hole 96 for the warm-up flow path has a round hole shape, for example. A plurality of the valve holes 96 for the warm-up flow path are formed at intervals in the circumferential direction of the circumferential wall portion 82. In the illustrated example, the valve hole 96 for the warm-up flow path has two large diameter holes which are arranged in the circumferential direction of the circumferential wall portion 82, and two small diameter holes which are smaller than the large diameter holes and arranged in the circumferential direction of the circumferential wall portion 82.

Further, the valve hole 97 for the air conditioning flow path has an oval shape in which the circumferential direction of the circumferential wall portion 82 is the major axis direction.

As shown in FIG. 12, a flow rate control groove 57 similar to that at the edge portion of the above-described valve hole 97 for the air conditioning flow path is provided at an edge portion of one valve hole 96A of the four valve holes 96 for the warm-up flow path. However, the flow rate control groove 57 provided at the edge portion of the valve hole 96A for the warm-up flow path on the circumferential wall portion 82 is disposed on a rear side of the edge portion of the valve hole 96A in the rotating direction R of the valve body 22. The bottom surface 57a of the flow rate control groove 57 at the edge portion of the valve hole 96A for the warm-up flow path is inclined such that an opening area thereof gradually increases toward the valve hole 96A.

Also, although the flow rate control grooves 57 are provided in the circumferential wall portion 82 of the valve body 22 at the edge portion on the front side of the valve hole 97 for the air conditioning flow path in the rotating direction R and at the edge portion on the rear side of the valve hole 96A for the warm-up flow path in the rotating direction R in the present embodiment, the valve holes in which the flow rate control grooves 57 are provided are not limited to these valve holes. The flow rate control groove 57 can be provided in any valve hole on at least one of the front side and the rear side of the valve hole in the rotating direction R. However, in the case of the control valve 8 exemplified in the description of the present embodiment, as will be described below, since a change in the flow rate of the cooling water at the outlet tends to increase when the seal cylinder member 131 starts to communicate with the valve hole 97 for the air conditioning flow path and when the seal cylinder member 131 stops communicating with the valve hole 96A for the warm-up flow path, it is particularly effective to set the flow rate control grooves 57 in the above portions.

Figure 13:
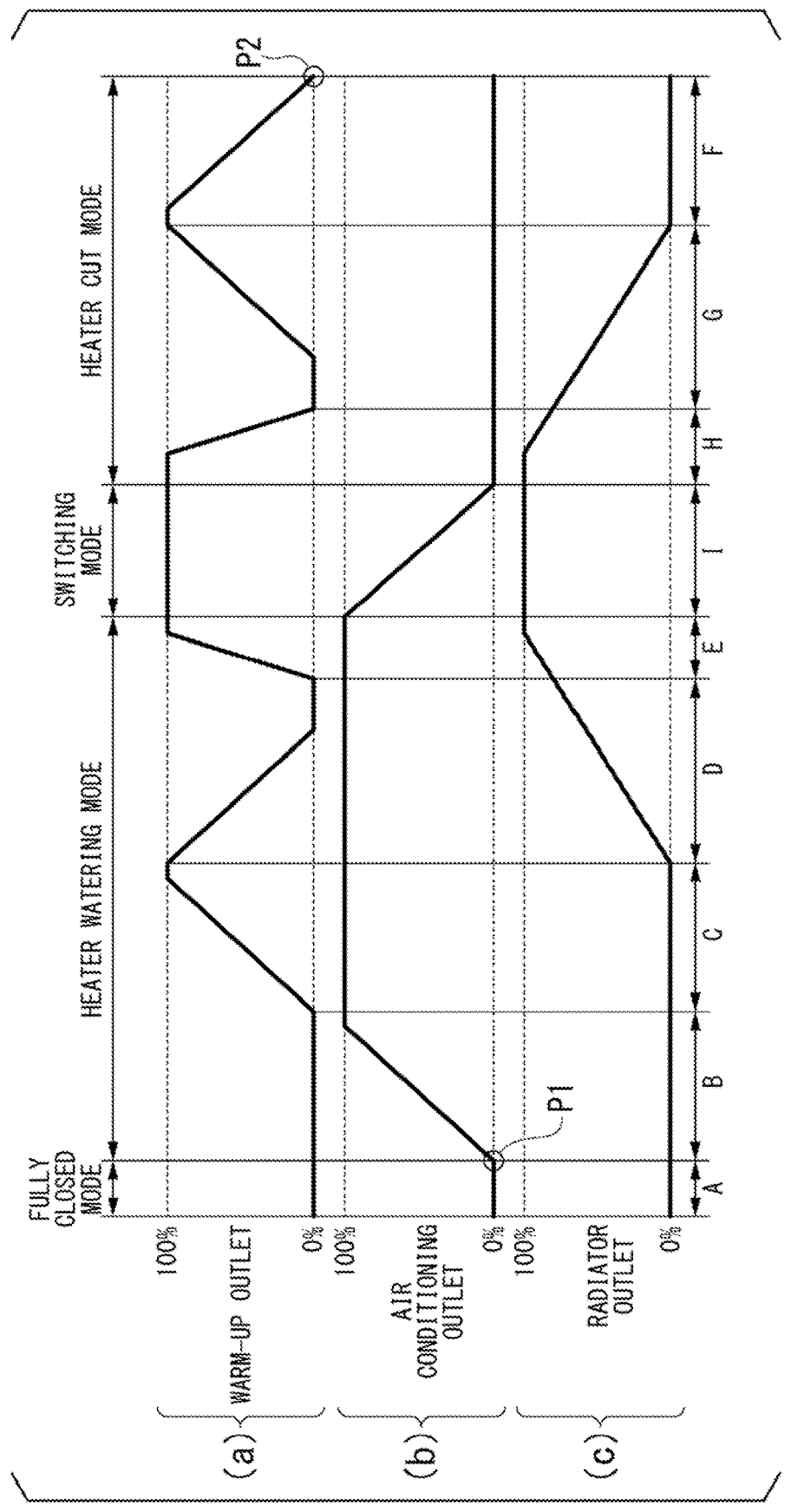
FIG. 13 is a diagram showing a change in flow rate at each outlet in accordance with control of rotation of the valve body according to the embodiment.

FIG. 13 is a diagram showing how a flow rate of each outlet (the warm-up outlet 56a, the air conditioning outlet 66a, and the radiator outlet 41b) changes in accordance with control of rotation of the valve body 22. In the case of the present embodiment, a change in opening degree of the four outlets in accordance with control of rotation of the valve body 22 has the following three modes.

(1) Heater Cut Mode

A mode in which the radiator outlet 41b is opened with the air conditioning outlet 66a closed.

(2) Heater Watering Mode

A mode in which the radiator outlet 41b is opened with the air conditioning outlet 66a open.

(3) Fully Closed Mode

A mode in which all of the warm-up outlet 56a, the radiator outlet 41b, and the air conditioning outlet 66a are closed.

(4) Switching Mode

A mode in which opening and closing of the air conditioning outlet 66a is switched with the radiator outlet 41b and the warm-up outlet 56a open.

In FIG. 13, a horizontal axis represents an operation range of the control valve 8, and a vertical axis represents an opening degree (from 0% to 100%) of each outlet. FIG. 13(a) shows an opening degree of the warm-up outlet 56a. FIG. 13(b) shows an opening degree of the air conditioning outlet 66a. FIG. 13(c) shows an opening degree of the radiator outlet 41b.

The operation range of the control valve 8 is divided into nine regions A, B, C, D, E, F, G, H, and I.

The fully closed mode consists of only the region A. In the region A, the opening degrees of all of the warm-up outlet 56a, the air conditioning outlet 66a, and the radiator outlet 41b are 0%.

The heater watering mode consists of four regions B, C, D, and E. In the region B, the opening degree of the warm-up outlet 66a and the radiator outlet 41b remains 0%, and the opening degree of the air conditioning outlet 66a changes in a range from 0% to 100%. In the region C, the opening degree of the radiator outlet 41b remains 0%, the opening degree of the air conditioning outlet 66a remains 100%, and the opening degree of the warm-up outlet 56a changes in a range from 0% to 100%. In the region D, the opening degree of the air conditioning outlet 66a remains 100%, the opening degree of the warm-up outlet 56a changes in a range from 100% to 0%, and the opening degree of the radiator outlet 41b changes in a range from 0% to about 80%. In the region E, the opening degree of the air conditioning outlet 66a remains 100%, the opening degree of the warm-up outlet 56a changes in a range from 0% to 100%, and the opening degree of the radiator outlet 41b changes in a range from about 80% to 100%.

The switching mode consists only of the region I. In the region I, the opening degrees of the warm-up outlet 56a and the radiator outlet 41b remain 100%, and the opening degree of the air conditioning outlet 66a changes in a range from 100% to 0%.

The heater cut mode consists of three regions H, G, and F. In the region H, the opening degree of the air conditioning outlet 66a remains 0%, the opening degree of the warm-up outlet 56a changes in a range from 100% to 0%, and the opening degree of the radiator outlet 41b changes in a range from 100% to about 80%. In the region G, the opening degree of the air conditioning outlet 66a remains 0%, the opening degree of the warm-up outlet 56a changes in a range from 0% to 100%, and the opening degree of the radiator outlet 41b changes in a range from about 80% to 0%. In the region F, the opening degrees of the air conditioning outlet 66a and the radiator outlet 41b remain 0%, and the opening degree of the warm-up outlet 56a changes in a range from 100% to 0%.

As shown in FIG. 13, at the time of transition from the fully closed mode to the heater watering mode, the opening degree of the air conditioning outlet 66a independently changes from 0% to 100% (see point P1 in FIG. 13), from a state in which all the opening degrees of the warm-up outlet 56a, the air conditioning outlet 66a, and the radiator outlet 41b are 0% (all the corresponding seal cylinder members 131 are blocked). That is, the seal cylinder member 131 corresponding to the air conditioning outlet 66a starts to communicate with the valve hole 97 first. At this time, cooling water inside the valve body 22 (in the casing 21) tends to flow hard into the air conditioning outlet 66a through the valve hole 97. For this reason, it is particularly effective to dispose the flow rate control groove 57 in the circumferential wall portion 82 of the valve body 22 at the edge portion on the front side of the valve hole 97 for the air conditioning flow path in the rotating direction R.

Further, as shown in FIG. 13, at the time of transition from the heat cut mode to the fully closed mode, the opening degree of the warm-up outlet 56a changes from 100% to 0% (see P2 in FIG. 13), from a state in which the opening degrees of the air conditioning outlet 66a and the radiator outlet 41b are 0% (the corresponding two seal cylinder members 131 are blocked). That is, the seal cylinder member 131 corresponding to the warm-up outlet 56a stops communicating with the valve hole 95 (is not in communication with the valve hole 95) at the end. For this reason, it is particularly effective to dispose the flow rate control groove 57 in the circumferential wall portion 82 of the valve body 22 at the edge portion on the front side of the valve hole 96A for the warm-up flow path in the rotating direction R.

<Communication Start Operation and Communication End Operation of Seal Cylinder Member>

As described above, the flow rate control groove 57 is provided in the circumferential wall portion 82 of the valve body 22 at the edge portion of the valve hole 97 for the air conditioning flow path on the front side in the rotating direction R. For this reason, when the outer circumferential surface of the circumferential wall portion 82 of the valve body 22 tries to shift from a state in which the seal cylinder member 131 communicating with the air conditioning flow path 13 is closed (see FIGS. 7 to 9 and the fully closed mode in FIG. 13) to the heater watering mode in accordance with the rotation of the valve body 22, the flow rate control groove 57 gradually overlaps an internal passage of the seal cylinder member 131 before the internal passage of the seal cylinder member 131 communicates directly with the valve hole 97 (see FIGS. 10 and 11).

In this way, the cooling water inside the valve body 22 flows out from the seal cylinder member 131 to the air conditioning outlet 66a via the valve hole 97 and the flow rate control groove 57. Thus, when an amount of the overlap between the flow rate control groove 57 and the internal passage of the seal cylinder member 131 increases, an amount of the cooling water flowing from the inside of the valve body 22 to the air conditioning outlet 66a gradually increases in accordance with the increase in the amount of the overlap. As a result, when the internal passage of the seal cylinder member 131 communicates directly with the valve hole 97, a large amount of the cooling water does not suddenly flow into the air conditioning outlet 66a.

Also, as described above, the flow rate control groove 57 is provided in the circumferential wall portion 82 of the valve body 22 at the edge portion of the valve hole 96A for the warm-up flow path on the rear side in the rotating direction R. For this reason, when the valve hole 96A for the warm-up flow path of the valve body 22 tries to shift from a state in which it communicates directly with the internal passage (warm-up outlet 56a) of the seal cylinder member 131 (see the heater cut mode in FIG. 13) to the fully closed mode in accordance with the rotation of the valve body 22, only the flow rate control groove 57 overlaps the internal passage of the seal cylinder member 131 after the valve hole 96A for the warm-up flow path ends the direct communication with the internal passage of the seal cylinder member 131. At this time, the cooling water inside the valve body 22 flows out to the warm-up outlet 56a via the valve hole 96A and the flow rate control groove 57.

Thus, when an amount of the overlap between the flow rate control groove 57 and the internal passage of the seal cylinder member 131 increases, an amount of the cooling water flowing from the inside of the valve body 22 to the warm-up outlet 56a gradually increases in accordance with the increase in the amount of the overlap. As a result, the flow of the cooling water to the warm-up outlet 56a does not stop abruptly.

Effects of Embodiment

As described above, in the control valve 8 of the present embodiment, the flow rate control groove 57 having the bottom surface 57a which is recessed with respect to the outer circumferential surface of the circumferential wall portion 82 and has the one end portion continuous with each valve hole is provided in the circumferential wall portion 82 of the valve body 22 on at least one of the front side and the rear side of the edge portion of each valve hole in the rotating direction of the valve body 22. Therefore, it is possible to inhibit a sudden change in a flow rate of the cooling water from occurring at the outlet at the time of communication start or the communication end of the seal cylinder member 131 by the function of the flow rate control groove 57.

In addition, since the flow rate control groove 57 of the control valve 8 of the present embodiment has the bottom surface 57a which is recessed with respect to the outer circumferential surface of the circumferential wall portion 82 and has the one end portion continuous with each valve hole, it is possible to inhibit a sudden change in a flow rate of cooling liquid from occurring at the outlet at the time of the communication start or the communication end of the seal cylinder member 131, without extremely narrowing the groove width.

Accordingly, in the control valve 8 of the present embodiment, it is possible to prevent desired performance from deteriorating due to contamination being caught therein, and the like. Therefore, it is possible to maintain a characteristic of a gradually changing flow rate at the outlet at the time of switching the communication state between the seal cylinder member 131 and the valve holes 97 and 96A for a long period of time.

Also, in the control valve 8 of the present embodiment, the bottom surface 57a of the flow rate control groove 57 is inclined such that the opening area of the flow rate control groove 57 gradually increases toward each of the valve holes 97 and 96A. For this reason, the flow rate of the cooling water to the outlet can be smoothly increased or decreased in accordance with the change in the amount of the overlap between the flow rate control groove 57 and the internal passage of the seal cylinder member 131.

Also, in the control valve 8 of the present embodiment, the flow rate control groove 57 is provided at the edge portion of the valve hole 97 for the air conditioning flow path on the communication start side which first starts to communicate with the seal cylinder member 131 from a state in which all the seal cylinder members 131 are blocked by the circumferential wall portion 82 of the valve body 22. For this reason, under the condition where the cooling water tends to flow into the air conditioning outlet 66a most rapidly, the cooling water can be gradually introduced into the air conditioning outlet 66a at the time of the communication start. Therefore, when the control valve 8 of the present embodiment is employed, it is possible to inhibit a sudden pressure fluctuation at the air conditioning outlet 66a at the time of the communication start of the seal cylinder member 131.

Also, in the control valve 8 of the present embodiment, the flow rate control groove 57 is provided at the edge portion of the valve hole for the warm-up flow path on the communication end side which blocks communication with the corresponding seal cylinder member at the end, from the state where each of the seal cylinder members corresponding to the radiator outlet 41b and the air conditioning outlet 66a is blocked.

For this reason, under the condition where the flow of the cooling water flowing hard tends to stop suddenly, it is possible to moderate sudden stoppage of the inflow of the cooling liquid at the warm-up outlet 56a at the time of the communication end. When the control valve 8 of the present embodiment is employed, a sudden pressure fluctuation at the air conditioning outlet 66a at the time of the communication end of the seal cylinder member 131 can be inhibited.

Further, it should be understood that the present invention is not limited to the above embodiment, and various changes in design can be made without departing from the scope of the invention. For example, although the bottom surface 57a of the flow rate control groove 57 is formed to be inclined toward the valve hole in the above embodiment, the bottom surface 57a of the flow rate control groove 57 may not necessarily be inclined and may be formed in a stepped shape such that the opening area thereof increases toward the valve hole side.

Also, although a case in which the valve body is formed in a cylindrical shape (having a uniform diameter in the axial direction) has been described in the above embodiment, the present invention is not limited to this configuration. That is, the outer diameter of the circumferential wall portion of the valve body may be changed in the axial direction. In this case, the circumferential wall portion of the valve body may have, for example, a spherical shape (a shape in which the diameter decreases from a central portion in the axial direction toward both end portions) or a saddle shape (a shape in which the diameter increases from the central portion in the axial direction toward both end portions), or a shape having a cubic curved surface such as a shape in which a plurality of spherical shapes or saddle shapes are continuous with each other in the axial direction.

What is claimed is:

1. A control valve comprising:
    a casing including an inlet through which a liquid flows in from an outside and an outlet through which the liquid that has flowed in an inside flows to the outside;
    a valve body which is rotatably disposed inside the casing and includes a circumferential wall portion formed with a valve hole providing communication between the inside and the outside; and
    a seal cylinder member of which one axial end portion communicates with a downstream side of the outlet and an other axial end portion is provided with a valve sliding contact surface that slidably comes into contact with an outer circumferential surface of the circumferential wall portion at a position at least partially overlapping a rotational path of the valve hole of the valve body,
    wherein a flow rate control groove including a bottom surface which is recessed with respect to the outer circumferential surface of the circumferential wall portion and includes one end portion that is continuous with the valve hole is provided on at least one of a front side and a rear side of an edge portion of the valve hole in the circumferential wall portion in a rotating direction of the valve body,
    wherein the bottom surface has a linear first end side parallel to an axis of the valve body, and
    wherein the first end side is a boundary portion with the outer circumferential surface of the circumferential wall portion.

2. The control valve according to claim 1, wherein the flow rate control groove includes the bottom surface that is inclined such that an opening area thereof increases toward the valve hole.

3. The control valve according to claim 1,
    wherein the control valve is provided with a plurality of the valve holes of the valve body and a plurality of the seal cylinder members corresponding to the valve holes, and the flow rate control groove is provided at the edge portion of the valve hole on a communication start side where it first communicates with the corresponding seal cylinder member from a state in which all the seal cylinder members are blocked by the circumferential wall portion of the valve body.

4. The control valve according to claim 1,
wherein the control valve is provided with a plurality of the valve holes of the valve body and a plurality of the seal cylinder members corresponding to the valve holes, and the flow rate control groove is provided at the edge portion of the valve hole on a communication end side where one seal cylinder member is blocked at the end from a state in which remaining seal cylinder members are blocked by the circumferential wall portion of the valve body while leaving the one seal cylinder member.

5. The control valve according to claim 1,
wherein the bottom surface has a second end side facing the valve hole at a position opposite to the first end side, and a pair of lateral sides connecting end portions of the first end side and the second end side to each other.

* * * * *